United States Patent
Shi et al.

(10) Patent No.: US 10,772,146 B2
(45) Date of Patent: Sep. 8, 2020

(54) MULTI-CONNECTIVITY COMMUNICATION METHOD, DEVICE, AND TERMINAL

(71) Applicant: HUAWEI TECHNOLOGIES CO., LTD., Shenzhen, Guangdong (CN)

(72) Inventors: Xiaoli Shi, Shanghai (CN); Wenjie Peng, Shanghai (CN); Hongzhuo Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/504,130

(22) Filed: Jul. 5, 2019

(65) Prior Publication Data

US 2019/0335521 A1 Oct. 31, 2019

Related U.S. Application Data

(63) Continuation of application No. PCT/CN2017/120219, filed on Dec. 29, 2017.

(30) Foreign Application Priority Data

Jan. 6, 2017 (CN) .......................... 2017 1 0011355

(51) Int. Cl.
*H04W 76/15* (2018.01)
*H04W 76/27* (2018.01)
(Continued)

(52) U.S. Cl.
CPC ........... *H04W 76/15* (2018.02); *H04W 76/27* (2018.02); *H04W 80/02* (2013.01); *H04W 80/08* (2013.01); *H04W 84/20* (2013.01); *H04W 92/10* (2013.01)

(58) Field of Classification Search
None
See application file for complete search history.

(56) References Cited

U.S. PATENT DOCUMENTS

2016/0302075 A1* 10/2016 Dudda ................. H04W 12/10
2016/0345316 A1 11/2016 Kazmi et al.
(Continued)

FOREIGN PATENT DOCUMENTS

| CN | 104581680 A | 4/2015 |
|---|---|---|
| CN | 106165488 A | 11/2016 |
| WO | 2016185758 A1 | 11/2016 |

OTHER PUBLICATIONS

Zte,"Consideration on the Dual RRC for LTE/NR tight interworking",3GPP TSG-RAN2 Meeting #94 R2-163739, Nanjing, China, Apr. 23-25, 2016,total 8 pages.
(Continued)

*Primary Examiner* — Alex Skripnikov
(74) *Attorney, Agent, or Firm* — Paul Christopher Hashim

(57) ABSTRACT

A multi-connectivity communication method includes: a secondary base station receives a first RRC message generated by an RRC entity of an anchor base station and a second RRC message generated by an RRC entity of the secondary base station. The secondary base station sends the first RRC message and the second RRC message to the terminal via an air interface between the secondary base station and the terminal, where a PDCP header, an RLC header, or a newly added adaptation layer carries indication information, the indication information is used to indicate a target RRC entity that generates an RRC message, the target RRC entity is the RRC entity of the anchor base station or the RRC entity of the secondary base station, and the anchor base station and the secondary base station use different radio access technologies.

20 Claims, 10 Drawing Sheets

```
┌─────────────────────────────────────────────────────┐
│ A secondary base station receives a first RRC      │
│ message generated by an RRC entity of an anchor    │─ 501
│ base station and an RRC entity of the              │
│ secondary base station generates a second RRC      │
│ message                                             │
└─────────────────────────────────────────────────────┘
                          │
                          ▼
┌─────────────────────────────────────────────────────┐
│ The secondary base station sends the first RRC     │
│ message and the second RRC message to a terminal   │
│ via an air interface between the secondary         │─ 502
│ base station and the terminal, where a PDCP        │
│ header, an RLC header, or a newly added            │
│ adaptation layer carries indication information,   │
│ and the indication information is used to          │
│ indicate a target RRC entity that generates an     │
│ RRC message                                         │
└─────────────────────────────────────────────────────┘
```

(51) Int. Cl.
    *H04W 80/02*     (2009.01)
    *H04W 80/08*     (2009.01)
    H04W 84/20     (2009.01)
    H04W 92/10     (2009.01)

(56) References Cited

U.S. PATENT DOCUMENTS

2017/0238349 A1*   8/2017   Uchino ................ H04W 76/10
                                                             370/329
2018/0007583 A1     1/2018   Hong et al.

OTHER PUBLICATIONS

3GPP TW 36.423 V14.0.0 (Sep. 2016);3rd Generation Partnership Project;Technical Specification Group Radio Access Network;Evolved Universal Terrestrial Radio Access Network(E-UTRAN);X2 application protocol (X2AP)(Release 14); total 239 pages.
Zte et al.,"Consideration on the transmission of NR RRC Message in LTE/NR tight interworking",3GPP TSG RAN NG2 Meeting #95bis R2-166340,Kaohsiung, Oct. 10-14, 2016,total 4 pages.
3GPP TSG RAN WG2 Meeting #95bis R2-166090, Discussion on RRC Diversity for LTE-NRTight Interworking;total 3 pages.
3GPP TSG-RAN WG2 #95bis TdocR2-166775, RRC configuration in LTE-NRtight-interworking o, total 3 pages.
3GPP TSG-RAN WG2 Meeting#95bis,R2-166494:"RRC message related issues for LTE-NR tight interworking",ITRI, Kaohsiung, Oct. 10-14, 2016,total 4 pages.
3GPP TSG-RAN2 Meeting #94,R2-163739,:"Consideration on the Dual RRC for L TE/NR tightinterworking",Zte, Nanjing, China, Apr. 23-25, 2016,total 8 pages.

* cited by examiner

MULTI-CONNECTIVITY COMMUNICATION METHOD, DEVICE, AND TERMINAL

CROSS-REFERENCE TO RELATED APPLICATIONS

This application is a continuation of International Application No. PCT/CN2017/120219, filed on Dec. 29, 2017, which claims priority to Chinese Patent Application No. 201710011355.4, filed on Jan. 6, 2017. The disclosures of the aforementioned applications are hereby incorporated by reference in their entireties.

TECHNICAL FIELD

Embodiments of the present disclosure relate to communications technologies, and in particular, to multi-connectivity communication methods, devices, and terminals.

BACKGROUND

As user requirements and technologies rapidly develop, the 5th generation mobile communications (5G for short) system or a new radio access technology (NR) are upcoming. The 5G system or an NR system can provide a transmission rate higher than that of a Long Term Evolution (LTE for short) network, and a highest theoretical transmission rate of the 5G system or the NR system can reach tens of gigabytes (Gb for short) per second. To increase the data transmission rate, the 5G system provides a multi-connectivity transmission method, that is, a terminal may access both the LTE network and the 5G system, and data of the terminal is transmitted by using both a base station of the LTE network and a base station of the 5G system. However, in an existing multi-connectivity solution, a data splitting anchor is in the LTE network. That is, the base station of the LTE network is a master base station, a base station of an NR network is a secondary base station, the master base station splits some data and transmits the data to the terminal by using the secondary base station, and the data is basically transmitted by using the LTE network. Compared with data transmission only on the LTE network, the existing multi-connectivity solution can also increase the data transmission rate, but cannot make use of an advantage of the data transmission rate of the 5G system.

Currently, two major researches of an LTE-NR multi-connectivity technology (LTE-NR tight interworking) are discussed in a standard. One research is radio resource control (RRC) diversity that is referred to as RRC diversity. The other research is directly generating an RRC message by a new radio access technology base station or a 5G base station (NR gNB) when the new radio access technology base station or the 5G base station serves as a secondary base station, and transmitting the RRC message to a terminal via an NR air interface, and this is referred to as a direct RRC message (direct RRC message).

FIG. 1 and FIG. 2 are schematic architectural diagrams of an LTE-NR multi-connectivity technology network in the prior art. The LTE-NR multi-connectivity technology network includes an LTE core network (EPC, E-UTRAN packet core), a new core network (NGC, NG-core), an LTE base station (eNB), and a new radio access technology base station (NR gNB). The new radio access technology may be 5G If an anchor base station is the LTE eNB, a corresponding secondary base station is the NR gNB. Correspondingly, if an anchor base station is the NR gNB, a corresponding secondary base station is the LTE eNB.

If the LTE eNB is an anchor base station, a protocol stack structure is shown in FIG. 3, and supports 3C and 1A. As shown in FIG. 1, for the 3C (split bearer), the LTE eNB is used as an anchor, data is split from a Packet Data Convergence Protocol (PDCP) layer to the gNB, and both a control plane (CP) and a user plane (UP) are on the LTE eNB; and for the 1A (SCG bearer), a control plane is on the LTE eNB, and a user plane is between the EPC and the gNB.

Assuming that the NR gNB is an anchor base station, a network architecture is shown in FIG. 2, and a protocol stack structure is shown in FIG. 4.

The LTE-NR multi-connectivity technology (LTE-NR tight interworking/LTE-NR DC) is as follows: A terminal performs access via LTE, a control plane is reserved in LTE, and then a user plane (UP) uses both LTE and 5G new radio in a manner similar to LTE DC (dual-connectivity), that is, the user plane is anchored at an LTE Packet Data Convergence Protocol (PDCP) layer to split data per data packet or bearer. Similarly, a terminal may alternatively perform access by using 5G, a control plane is reserved in 5G, and a user plane is anchored at a 5G PDCP layer in a manner similar to LTE DC to split data.

To meet an ultra-reliable and low latency communications (URLLC) service requirement, and to improve RRC message transmission reliability in an LTE-NR multi-connectivity scenario, if the anchor base station is the LTE eNB, an RRC message generated by the anchor base station (MeNB) may be separately transmitted to a terminal via an LTE air interface and an NR air interface. When the RRC message is transmitted to the terminal via the NR air interface, the RRC message needs to be transmitted to the NR gNB via an interface between LTE and NR, and then is sent by the NR gNB to the terminal. After receiving the signaling message, an NR module of the terminal converges the signaling message to an LTE module for processing.

In the LTE-NR multi-connectivity scenario, NR may have its own RRC entity, and the RRC entity may directly create and send an RRC message to the terminal. That is, after an NR gNB is added for the LTE eNB to perform multi-stream convergence data transmission, if the NR gNB needs to modify a configuration, the NR gNB directly generates an RRC configuration message, and sends the RRC configuration message to the terminal via the NR air interface.

In the case of two technologies, as NR has its own RRC entity and can send a direct RRC message, and NR supports RRC diversity, there is currently no technical solution of how to transmit an RRC message of the NR air interface and how a receive end identifies the RRC message.

SUMMARY

Embodiments of the present disclosure provide a multi-connectivity communication method, a device, and a terminal, to resolve a problem of how a secondary base station transmits an RRC message and how the terminal identifies the RRC message when NR has its own RRC entity and supports RRC diversity in an LTE-NR multi-connectivity technology scenario.

According to a first aspect of the present disclosure, a multi-connectivity communication method is provided, including:

receiving, by a secondary base station, a first RRC message generated by an RRC entity of an anchor base station and generating, by an RRC entity of the secondary base station, a second RRC message by; and sending, by the secondary base station, the first RRC message and the second RRC message to a terminal via an air interface between the secondary base station and the terminal, where a Packet Data Convergence Protocol (PDCP) header, a Radio Link Control (RLC) header, or a newly added adaptation layer carries indication information, and the indication information is used to indicate a target RRC entity that generates an RRC message, where the target RRC entity is the RRC entity of the anchor base station or the RRC entity of the secondary base station, and the anchor base station and the secondary base station use different radio access technologies.

Optionally, the indication information is carried by using an idle field in the PDCP header, or by adding a new field to the PDCP header.

Optionally, the indication information includes first indication information and second indication information, where the first indication information is used to indicate that the target RRC entity is the RRC entity of the anchor base station, and the second indication information is used to indicate that the target RRC entity is the RRC entity of the secondary base station.

Optionally, the first indication information is added by the anchor base station to a PDCP header of the anchor base station, and is sent to the secondary base station via an interface between the anchor base station and the secondary base station; and the second indication information is added by the secondary base station to a PDCP header of the secondary base station.

Optionally, the first indication information and the second indication information are added by the secondary base station to an RLC header of the secondary base station.

Optionally, the method further includes: sending, by the secondary base station, a correspondence between the first indication information and the RRC entity of the anchor base station and a correspondence between the second indication information and the RRC entity of the secondary base station to the terminal via the air interface between the secondary base station and the terminal.

Optionally, the first indication information is added by the anchor base station to a newly added adaptation layer of the anchor base station, and is sent to the secondary base station via an interface between the anchor base station and the secondary base station; and the second indication information is added by the secondary base station to a newly added adaptation layer of the secondary base station.

Optionally, a correspondence between the first indication information and the RRC entity of the anchor base station is sent by the anchor base station to the terminal via an air interface between the anchor base station and the terminal, and the method further includes:

sending, by the secondary base station, a correspondence between the second indication information and the RRC entity of the secondary base station to the terminal via the air interface between the secondary base station and the terminal.

Optionally, the method further includes: sending, by the secondary base station, uplink grant (UL grant) information to the anchor base station via an interface between the anchor base station and the secondary base station, so that the anchor base station sends the RRC message generated by the RRC entity of the anchor base station to the terminal and the anchor base station instructs the terminal to establish an RRC connection to the secondary base station.

Optionally, the method further includes: sending, by the secondary base station, a random access response message including uplink grant (UL grant) information to the terminal, to indicate that the terminal establishes an RRC connection to the secondary base station.

Optionally, the secondary base station is capable of transmitting the RRC message generated by the RRC entity of the anchor base station, and is capable of directly transmitting the RRC message generated by the RRC entity of the secondary base station.

According to a second aspect of the present disclosure, a multi-connectivity communication method is provided, including:

receiving, by a secondary base station, a first RRC message generated by an RRC entity of an anchor base station and generating, by an RRC entity of the secondary base station, a second RRC message; and sending, by the secondary base station, the first RRC message and the second RRC message to a terminal via an air interface between the secondary base station and the terminal, where the first RRC message is encapsulated by the secondary base station into an RRC container, so as to determine, when the terminal parses out the first RRC message from the RRC container, that the first RRC message is generated by the RRC entity of the anchor base station, where the anchor base station and the secondary base station use different radio access technologies.

According to a third aspect of the present disclosure, a multi-connectivity communication method is provided, including:

receiving, by a secondary base station, a first RRC message generated by an RRC entity of an anchor base station and generating, by an RRC entity of the secondary base station, a second RRC message; and transmitting, by the secondary base station, the first RRC message and the second RRC message to a terminal via two different logical channels of an air interface between the secondary base station and the terminal, so that the terminal distinguishes, based on the different logical channels, a target RRC entity that generates an RRC message, where the target RRC entity is the RRC entity of the anchor base station or the RRC entity of the secondary base station, and the anchor base station and the secondary base station use different radio access technologies.

Optionally, the method further includes: establishing, by the secondary base station, two different SRBs corresponding to the two different logical channels; and sending, by the secondary base station, correspondences between configuration information of the two different SRBs and the RRC entities that correspondingly generate the RRC messages to the terminal.

Optionally, the two different SRBs include a first SRB and a second SRB, where the first SRB is used to transmit the first RRC message, and the second SRB is used to transmit the second RRC message, and the sending, by the secondary base station, correspondences between configuration information of the two different SRBs and the RRC entities that correspondingly generate the RRC messages to the terminal specifically includes:

sending, by the secondary base station, a correspondence between configuration information of the first SRB and the RRC entity of the anchor base station to the anchor base station via an interface between the anchor base station and the secondary base station, so that the anchor base station sends the correspondence to the terminal via an air interface between the anchor base station and the terminal; and sending, by the secondary base station, a correspondence between configuration information of the second SRB and the RRC entity of the secondary base station to the terminal via the air interface between the secondary base station and the terminal.

According to a fourth aspect of the present disclosure, a multi-connectivity communication method is provided, including:

receiving, by a terminal via an air interface between a secondary base station and the terminal, RRC messages sent by the secondary base station, where the RRC messages include a first RRC message generated by an RRC entity of an anchor base station and a second RRC message generated by an RRC entity of the secondary base station;

obtaining, by the terminal, indication information from a PDCP header, an RLC header, or a newly added adaptation layer when parsing the RRC messages, where the indication information is used to indicate a target RRC entity that generates an RRC message; and after determining, based on the indication information, the target RRC entity that generates the RRC message, handing, by the terminal, the received RRC messages to corresponding RRC modules for processing, where the target RRC entity is the RRC entity of the anchor base station or the RRC entity of the secondary base station, and the anchor base station and the secondary base station use different radio access technologies.

Optionally, the indication information is carried by using an idle field in the PDCP header, or by adding a new field to the PDCP header.

Optionally, the indication information includes first indication information and second indication information, where the first indication information is used to indicate that the target RRC entity is the RRC entity of the anchor base station, and the second indication information is used to indicate that the target RRC entity is the RRC entity of the secondary base station.

Optionally, the first indication information is added by the anchor base station to a PDCP header of the anchor base station, and is sent to the secondary base station via an interface between the anchor base station and the secondary base station; and the second indication information is added by the secondary base station to a PDCP header of the secondary base station.

Optionally, the first indication information and the second indication information are added by the secondary base station to an RLC header of the secondary base station.

Optionally, the method further includes: receiving, by the terminal via the air interface between the secondary base station and the terminal, a correspondence between the first indication information and the RRC entity of the anchor base station and a correspondence between the second indication information and the RRC entity of the secondary base station, where the correspondences are sent by the secondary base station.

Optionally, the first indication information is added by the anchor base station to a newly added adaptation layer of the anchor base station, is sent to the secondary base station via an interface between the anchor base station and the secondary base station, and then is sent by the secondary base station to the terminal via the air interface between the secondary base station and the terminal; and the second indication information is added by the secondary base station to a newly added adaptation layer of the secondary base station, and then is sent by the secondary base station to the terminal via the air interface between the secondary base station and the terminal.

Optionally, a correspondence between the first indication information and the RRC entity of the anchor base station is sent by the anchor base station to the terminal via an air interface between the anchor base station and the terminal, and the method further includes:

receiving, by the terminal via the air interface between the secondary base station and the terminal, a correspondence that is between the second indication information and the RRC entity of the secondary base station and that is sent by the secondary base station.

Optionally, the secondary base station is capable of transmitting the RRC message generated by the RRC entity of the anchor base station, and is capable of directly transmitting the RRC message generated by the RRC entity of the secondary base station.

According to a fifth aspect of the present disclosure, a multi-connectivity communication method is provided, including:

receiving, by a terminal via an air interface between a secondary base station and the terminal, RRC messages sent by the secondary base station, where the RRC messages include a first RRC message generated by an RRC entity of an anchor base station and a second RRC message generated by an RRC entity of the secondary base station; and if the terminal parses out an RRC message from an RRC container when parsing the RRC messages, determining, by the terminal, that the RRC message parsed out from the RRC container is the first RRC message generated by the RRC entity of the anchor base station, where the anchor base station and the secondary base station use different radio access technologies.

According to a sixth aspect of the present disclosure, a multi-connectivity communication method is provided, including:

receiving, by a terminal via different logical channels of an air interface between a secondary base station and the terminal, RRC messages sent by the secondary base station, where the RRC messages include a first RRC message generated by an RRC entity of an anchor base station and a second RRC message generated by an RRC entity of the secondary base station; and distinguishing, by the terminal based on the different logical channels, a target RRC entity that generates an RRC message, where the target RRC entity is the RRC entity of the anchor base station or the RRC entity of the secondary base station, and the anchor base station and the secondary base station use different radio access technologies.

Optionally, the method further includes: receiving, by the terminal, configuration information of two different SRBs, where the configuration information of the two different SRBs corresponds to the two different logical channels, and includes correspondences between the configuration information of the SRBs and the RRC entities that correspondingly generate the RRC messages.

Optionally, the two different SRBs include a first SRB and a second SRB, where the first SRB is used to transmit the first RRC message, and the second SRB is used to transmit the second RRC message, and a correspondence between configuration information of the first SRB and the RRC entity of the anchor base station is sent by the secondary base station to the anchor base station via an interface between the anchor base station and the secondary base station, and the method further includes:

receiving, by the terminal, the correspondence that is between the configuration information of the first SRB and the RRC entity of the anchor base station and that is sent by the anchor base station via an air interface between the anchor base station and the terminal; and receiving, by the terminal, a correspondence that is between configuration information of the second SRB and the RRC entity of the secondary base station and that is sent by the secondary base station via the air interface between the secondary base station and the terminal.

According to a seventh aspect of the present disclosure, a multi-connectivity secondary base station is provided, including:

a receiver, configured to receive a first RRC message generated by an RRC entity of an anchor base station;

an RRC entity, configured to generate a second RRC message; and a transmitter, configured to send the first RRC message and the second RRC message to a terminal via an air interface between the secondary base station and the terminal, where a PDCP header, an RLC header, or a newly added adaptation layer carries indication information, and the indication information is used to indicate a target RRC entity that generates an RRC message, where the target RRC entity is the RRC entity of the anchor base station or the RRC entity of the secondary base station, and the anchor base station and the secondary base station use different radio access technologies.

Optionally, the indication information is carried by using an idle field in the PDCP header, or by adding a new field to the PDCP header.

Optionally, the indication information includes first indication information and second indication information, where the first indication information is used to indicate that the target RRC entity is the RRC entity of the anchor base station, and the second indication information is used to indicate that the target RRC entity is the RRC entity of the secondary base station.

Optionally, the first indication information is added by the anchor base station to a PDCP header of the anchor base station, and is sent to the secondary base station via an interface between the anchor base station and the secondary base station; and the secondary base station further includes: a processor, configured to add the second indication information to a PDCP header of the secondary base station.

Optionally, the secondary base station further includes: a processor, configured to add the first indication information and the second indication information to an RLC header of the secondary base station.

Optionally, the transmitter is further configured to send a correspondence between the first indication information and the RRC entity of the anchor base station and a correspondence between the second indication information and the RRC entity of the secondary base station to the terminal via the air interface between the secondary base station and the terminal.

Optionally, the first indication information is added by the anchor base station to a newly added adaptation layer of the anchor base station, and is sent to the secondary base station via an interface between the anchor base station and the secondary base station; and the secondary base station further includes: a processor, configured to add the second indication information to a newly added adaptation layer of the secondary base station.

Optionally, a correspondence between the first indication information and the RRC entity of the anchor base station is sent by the anchor base station to the terminal via an air interface between the anchor base station and the terminal, and the transmitter is further configured to send a correspondence between the second indication information and the RRC entity of the secondary base station to the terminal via the air interface between the secondary base station and the terminal.

Optionally, the transmitter is further configured to send uplink grant (UL grant) information to the anchor base station via an interface between the anchor base station and the secondary base station, so that the anchor base station sends the RRC message generated by the RRC entity of the anchor base station to the terminal and the anchor base station instructs the terminal to establish an RRC connection to the secondary base station.

Optionally, the transmitter is further configured to send a random access response message including uplink grant (UL grant) information to the terminal, to indicate that the terminal establishes an RRC connection to the secondary base station.

Optionally, the secondary base station is capable of transmitting the RRC message generated by the RRC entity of the anchor base station, and is capable of directly transmitting the RRC message generated by the RRC entity of the secondary base station.

According to an eighth aspect of the present disclosure, a multi-connectivity secondary base station is provided, including:

a receiver, configured to receive a first RRC message generated by an RRC entity of an anchor base station;

an RRC entity, configured to generate a second RRC message;

a transmitter, configured to send the first RRC message and the second RRC message to a terminal via an air interface between the secondary base station and the terminal; and a processor, configured to encapsulate the first RRC message into an RRC container, so as to determine, when the terminal parses out the first RRC message from the RRC container, that the first RRC message is generated by the RRC entity of the anchor base station, where the anchor base station and the secondary base station use different radio access technologies.

According to a ninth aspect of the present disclosure, a multi-connectivity secondary base station is provided, including:

a receiver, configured to receive a first RRC message generated by an RRC entity of an anchor base station;

an RRC entity, configured to generate a second RRC message; and a transmitter, configured to send the first RRC message and the second RRC message to a terminal via two different logical channels of an air interface between the secondary base station and the terminal, so that the terminal distinguishes, based on the different logical channels, a target RRC entity that generates an RRC message, where the target RRC entity is the RRC entity of the anchor base station or the RRC entity of the secondary base station, and the anchor base station and the secondary base station use different radio access technologies.

Optionally, the secondary base station further includes: a processor, configured to establish two different SRBs corresponding to the two different logical channels.

The transmitter is further configured to send correspondences between configuration information of the two different SRBs and the RRC entities that correspondingly generate the RRC messages to the terminal.

Optionally, the two different SRBs include a first SRB and a second SRB, where the first SRB is used to transmit the first RRC message, and the second SRB is used to transmit the second RRC message.

The transmitter is further configured to send a correspondence between configuration information of the first SRB and the RRC entity of the anchor base station to the anchor base station via an interface between the anchor base station and the secondary base station, so that the anchor base station sends the correspondence to the terminal via an air interface between the anchor base station and the terminal.

The transmitter is further configured to send a correspondence between configuration information of the second SRB and the RRC entity of the secondary base station to the terminal via the air interface between the secondary base station and the terminal.

According to a tenth aspect of the present disclosure, a terminal is provided, including:

a receiver, configured to receive, via an air interface between a secondary base station and the terminal, RRC messages sent by the secondary base station, where the RRC messages include a first RRC message generated by an RRC entity of an anchor base station and a second RRC message generated by an RRC entity of the secondary base station; and a processor, configured to: obtain indication information from a PDCP header, an RLC header, or a newly added adaptation layer when parsing the RRC messages, where the indication information is used to indicate a target RRC entity that generates an RRC message; and after determining, based on the indication information, the target RRC entity that generates the RRC message, hand the received RRC messages to corresponding RRC modules for processing, where the target RRC entity is the RRC entity of the anchor base station or the RRC entity of the secondary base station, and the anchor base station and the secondary base station use different radio access technologies.

Optionally, the indication information is carried by using an idle field in the PDCP header, or by adding a new field to the PDCP header.

Optionally, the indication information includes first indication information and second indication information, where the first indication information is used to indicate that the target RRC entity is the RRC entity of the anchor base station, and the second indication information is used to indicate that the target RRC entity is the RRC entity of the secondary base station.

Optionally, the first indication information is added by the anchor base station to a PDCP header of the anchor base station, and is sent to the secondary base station via an interface between the anchor base station and the secondary base station; and the second indication information is added by the secondary base station to a PDCP header of the secondary base station.

Optionally, the first indication information and the second indication information are added by the secondary base station to an RLC header of the secondary base station.

Optionally, the receiver is further configured to receive, via the air interface between the secondary base station and the terminal, a correspondence between the first indication information and the RRC entity of the anchor base station and a correspondence between the second indication information and the RRC entity of the secondary base station, where the correspondences are sent by the secondary base station.

Optionally, the first indication information is added by the anchor base station to a newly added adaptation layer of the anchor base station, and is sent to the secondary base station via an interface between the anchor base station and the secondary base station; and the second indication information is added by the secondary base station to a newly added adaptation layer of the secondary base station. The receiver is further configured to receive the first indication information and the second indication information from the second-ary base station via the air interface between the secondary base station and the terminal.

Optionally, the receiver is further configured to receive, via the air interface between the secondary base station and the terminal, a correspondence that is between the second indication information and the RRC entity of the secondary base station and that is sent by the secondary base station.

Optionally, the secondary base station is capable of transmitting the RRC message generated by the RRC entity of the anchor base station, and is capable of directly transmitting the RRC message generated by the RRC entity of the secondary base station.

According to an eleventh aspect of the present disclosure, a terminal is provided, including:

a receiver, configured to receive, via an air interface between a secondary base station and the terminal, RRC messages sent by the secondary base station, where the RRC messages include a first RRC message generated by an RRC entity of an anchor base station and a second RRC message generated by an RRC entity of the secondary base station; and a processor, configured to: if an RRC message is parsed out from an RRC container when parsing the RRC messages, determine that the RRC message parsed out from the RRC container is the first RRC message generated by the RRC entity of the anchor base station, where the anchor base station and the secondary base station use different radio access technologies.

According to a twelfth aspect of the present disclosure, a terminal is provided, including:

a receiver, configured to receive, via different logical channels of an air interface between a secondary base station and the terminal, RRC messages sent by the secondary base station, where the RRC messages include a first RRC message generated by an RRC entity of an anchor base station and a second RRC message generated by an RRC entity of the secondary base station; and a processor, configured to distinguish, based on the different logical channels, a target RRC entity that generates an RRC message, where the target RRC entity is the RRC entity of the anchor base station or the RRC entity of the secondary base station, and the anchor base station and the secondary base station use different radio access technologies.

Optionally, the receiver is further configured to receive configuration information of two different SRBs, where the configuration information of the two different SRBs corresponds to the two different logical channels, and includes correspondences between the configuration information of the SRBs and the RRC entities that correspondingly generate the RRC messages.

Optionally, the two different SRBs include a first SRB and a second SRB, where the first SRB is used to transmit the first RRC message, and the second SRB is used to transmit the second RRC message.

A correspondence between configuration information of the first SRB and the RRC entity of the anchor base station is sent by the secondary base station to the anchor base station via an interface between the anchor base station and the secondary base station. The receiver is further configured to receive a correspondence that is between the configuration information of the first SRB and the RRC entity of the anchor base station and that is sent by the anchor base station via an air interface between the anchor base station and the terminal.

The receiver is further configured to receive a correspondence that is between configuration information of the second SRB and the RRC entity of the secondary base station and that is sent by the secondary base station via the air interface between the secondary base station and the terminal.

According to the multi-connectivity communication method, the device, and the terminal that are described above, a problem of how the secondary base station transmits an RRC message and how the terminal identifies the RRC message when NR has its own RRC entity and supports RRC diversity in an LTE-NR multi-connectivity technology scenario is resolved.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments represent some, but not all, of the embodiments of the present disclosure. All other embodiments obtained by a person of ordinary skill in the art based on the embodiments of the present disclosure without creative efforts shall fall within the protection scope of the present disclosure.

A multi-connectivity (multiple connectivity) communication method provided in an embodiment of the present disclosure is as follows: A terminal may access both a first network and a new radio access technology (New RAT or NR for short) network, and an access network device of the first network and an access network device of the new radio access network can simultaneously provide a service for the terminal. The first network may be an existing network, such as an LTE network, a Wireless Fidelity (Wi-Fi for short) network, a Global System for Mobile Communications (GSM for short) network, a Code Division Multiple Access (CDMA for short) network, or a Wideband Code Division Multiple Access (WCDMA for short) network. The new radio access network can provide a transmission rate higher than that of the LTE network, and is also referred to as a 5G network, a next-generation network, or the like. The access network device of the new radio access network is also referred to as an NR node or an NR BS (base station). This is not limited herein.

Multi-connectivity in this embodiment of the present disclosure is specifically as follows: A terminal accesses a core network of a first network by using an access network device of the first network, control plane (CP for short) data is transmitted on the first network, and user plane (UP for short) data is transmitted over both an air interface of the first network and an air interface of the new radio access network. A user plane is anchored at a Packet Data Convergence Protocol (PDCP) layer of the access network device of the new radio access network to split data per data packet or bearer.

Figure 1:
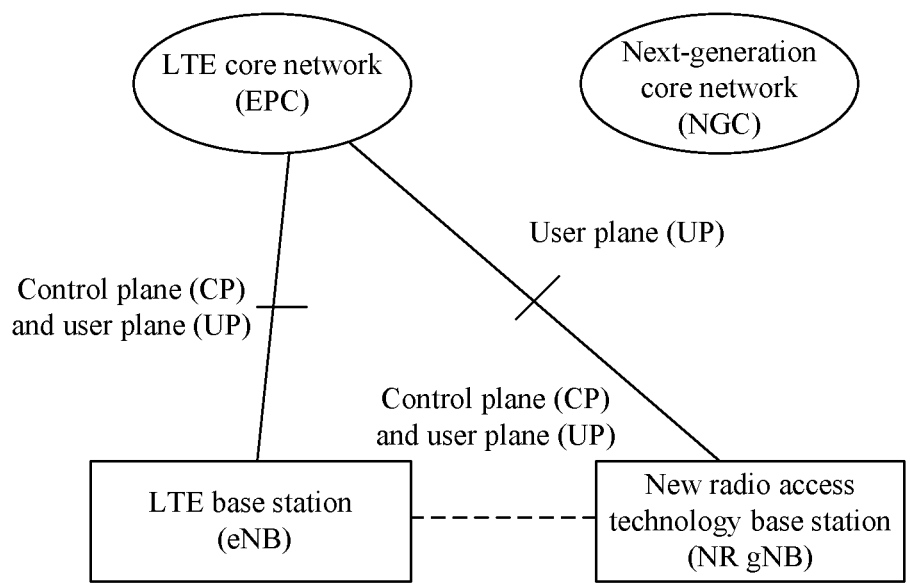
FIG. 1 is a schematic architectural diagram of an LTE-NR multi-connectivity technology network in the prior art.
Figure 2:
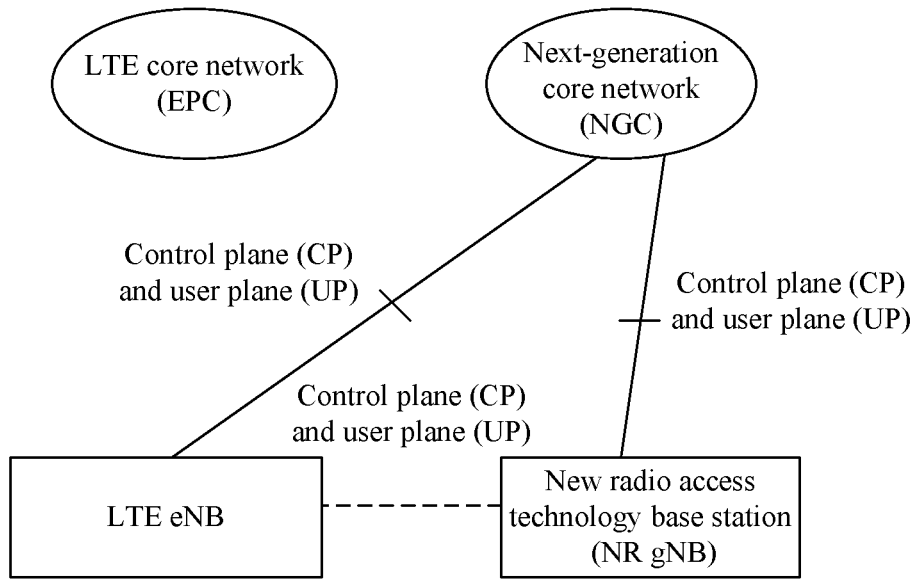
FIG. 2 is a schematic architectural diagram of another LTE-NR multi-connectivity technology network in the prior art.
Figure 3:
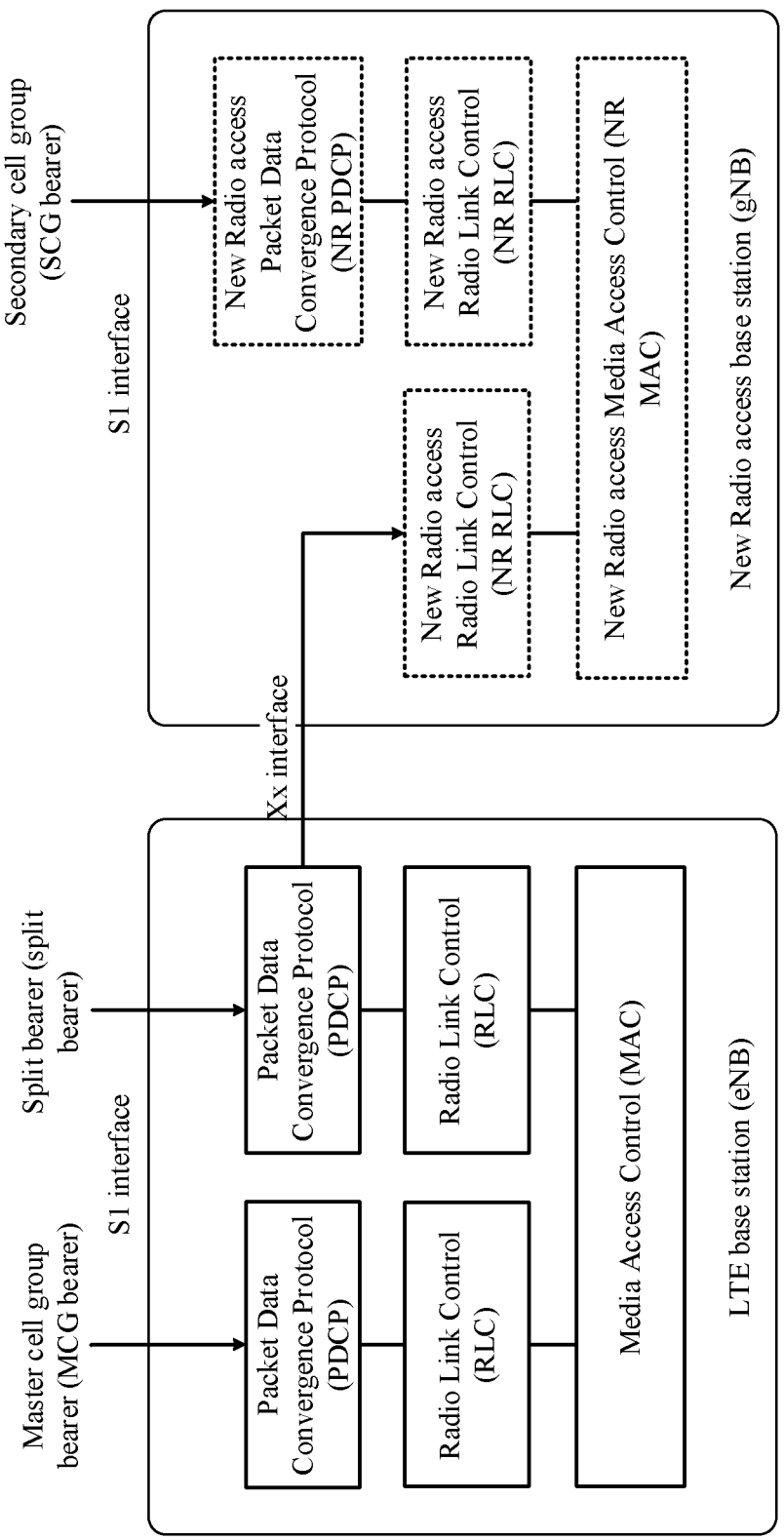
FIG. 3 is a schematic structural diagram of a protocol stack in which an LTE eNB is an anchor base station in the prior art.
Figure 4:
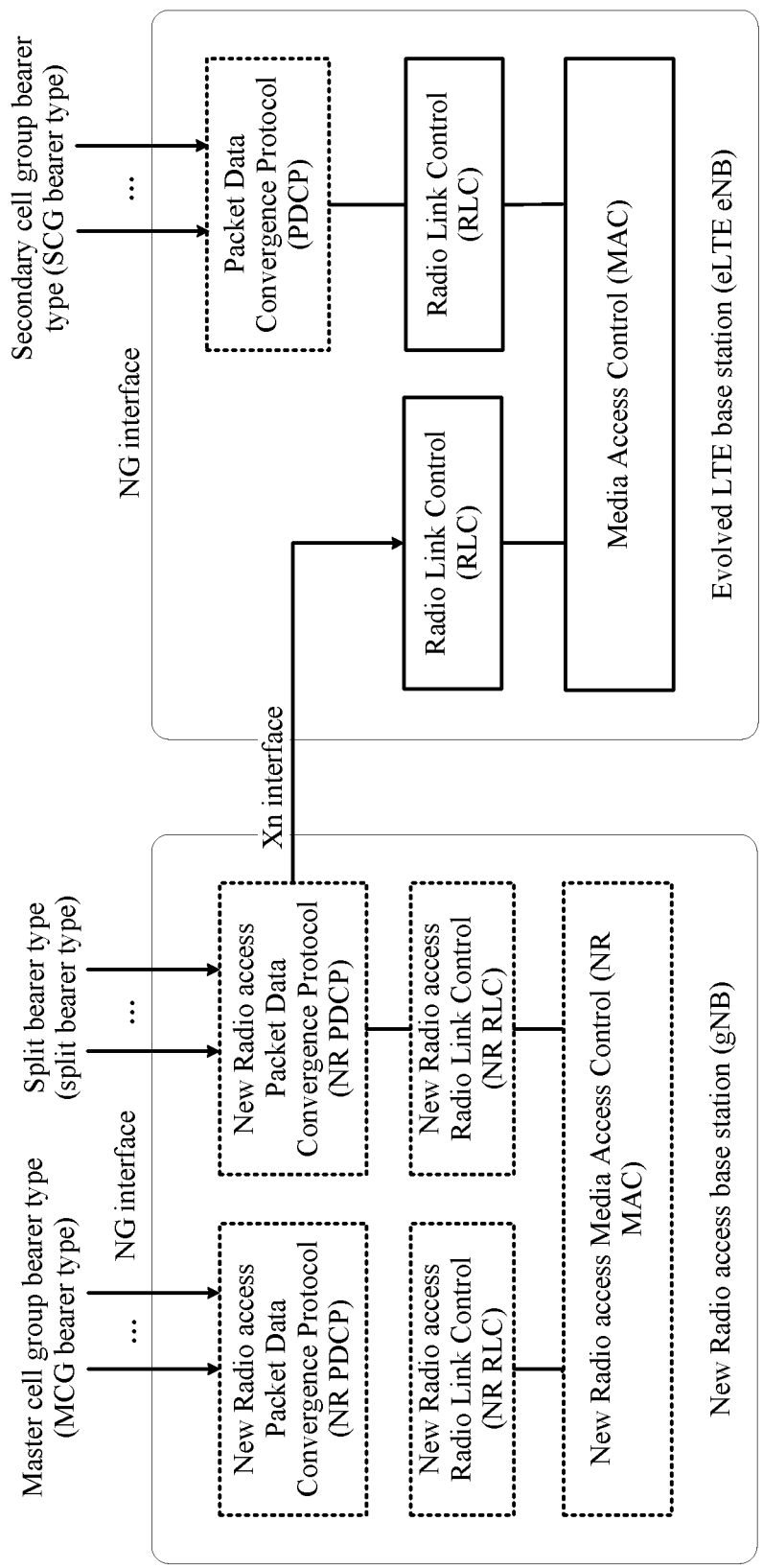
FIG. 4 is a schematic structural diagram of a protocol stack in which an NR gNB is an anchor base station in the prior art.
Figure 5:
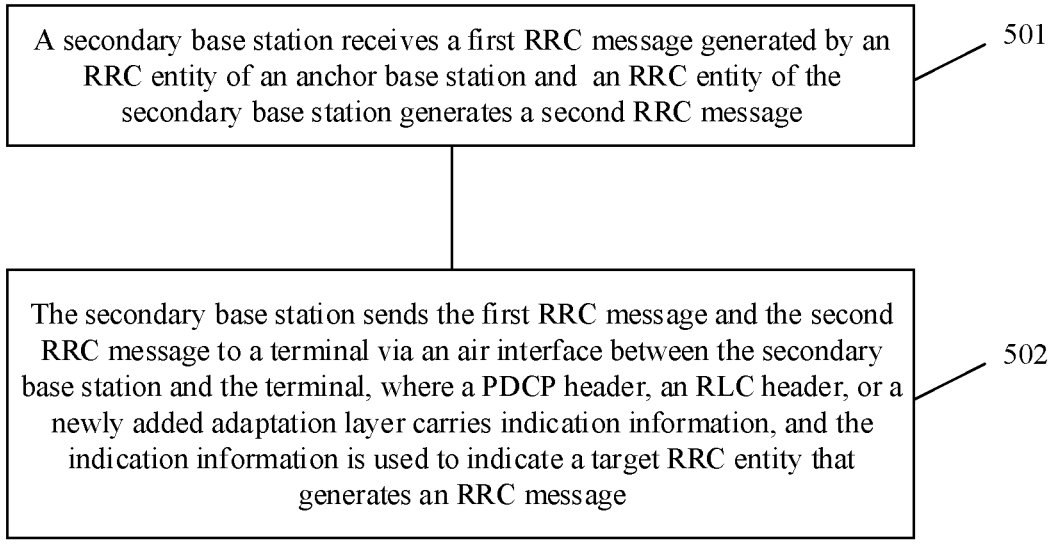
FIG. 5 is a schematic flowchart of a multi-connectivity communication method according to an embodiment of the present disclosure.

FIG. 5 is a schematic flowchart of a multi-connectivity communication method according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

Step 501: A secondary base station receives a first RRC message generated by an RRC entity of an anchor base station and an RRC entity of the secondary base station generates a second RRC message.

Step 502: The secondary base station sends the first RRC message and the second RRC message to a terminal via an air interface between the secondary base station and the terminal, where a PDCP header, an RLC header, or a newly added adaptation layer carries indication information, and the indication information is used to indicate a target RRC entity that generates an RRC message.

The target RRC entity is the RRC entity of the anchor base station or the RRC entity of the secondary base station, and the anchor base station and the secondary base station use different radio access technologies.

Optionally, the indication information is carried by using an idle field in the PDCP header, or by adding a new field to the PDCP header.

Optionally, the indication information includes first indication information and second indication information, where the first indication information is used to indicate that the target RRC entity is the RRC entity of the anchor base station, and the second indication information is used to indicate that the target RRC entity is the RRC entity of the secondary base station.

Optionally, the first indication information is added by the anchor base station to a PDCP header of the anchor base station, and is sent to the secondary base station via an interface between the anchor base station and the secondary base station; and the second indication information is added by the secondary base station to a PDCP header of the secondary base station.

Optionally, the first indication information and the second indication information are added by the secondary base station to an RLC header of the secondary base station.

Optionally, the method further includes: sending, by the secondary base station, a correspondence between the first indication information and the RRC entity of the anchor base station and a correspondence between the second indication information and the RRC entity of the secondary base station to the terminal via the air interface between the secondary base station and the terminal.

Optionally, the first indication information is added by the anchor base station to a newly added adaptation layer of the anchor base station, and is sent to the secondary base station via an interface between the anchor base station and the secondary base station; and the second indication information is added by the secondary base station to a newly added adaptation layer of the secondary base station.

Optionally, the first indication information and the second indication information are added by the secondary base station to a newly added adaptation layer of the secondary base station.

Optionally, a correspondence between the first indication information and the RRC entity of the anchor base station is sent by the anchor base station to the terminal via an air interface between the anchor base station and the terminal, and the method further includes: sending, by the secondary base station, a correspondence between the second indication information and the RRC entity of the secondary base station to the terminal via the air interface between the secondary base station and the terminal.

Optionally, the method further includes: sending, by the secondary base station, uplink grant (UL grant) information to the anchor base station via an interface between the anchor base station and the secondary base station, so that the anchor base station sends the RRC message generated by the RRC entity of the anchor base station to the terminal and the anchor base station instructs the terminal to establish an RRC connection to the secondary base station.

Optionally, the method further includes: sending, by the secondary base station, a random access response message including uplink grant (UL grant) information to the terminal to indicate that the terminal establishes an RRC connection to the secondary base station.

Optionally, the secondary base station is capable of transmitting the RRC message generated by the RRC entity of the anchor base station, and is capable of directly transmitting the RRC message generated by the RRC entity of the secondary base station.

Figure 6:
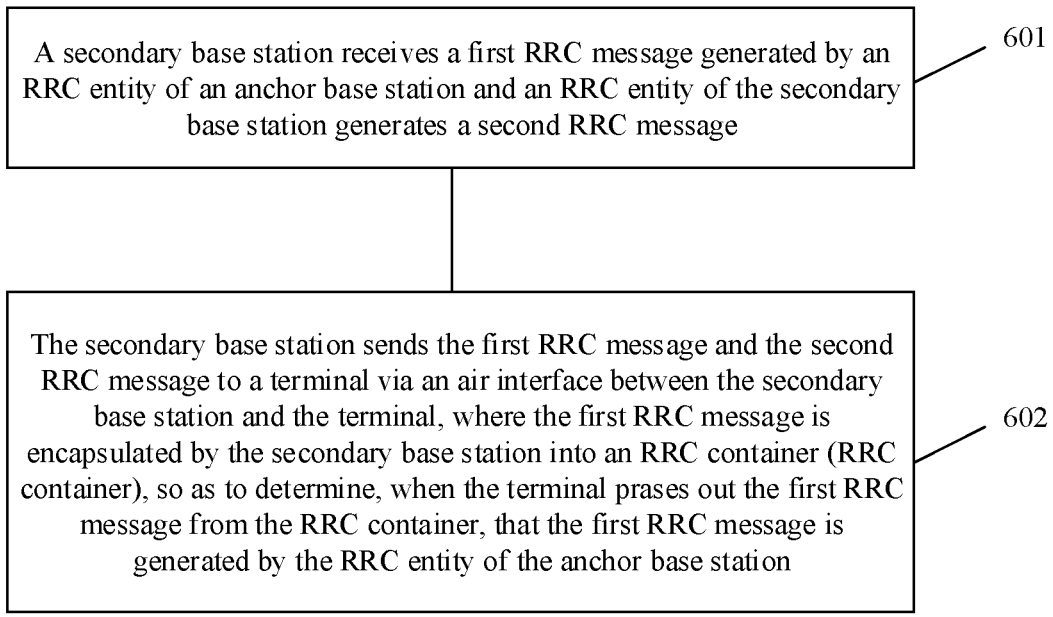
FIG. 6 is a schematic flowchart of another multi-connectivity communication method according to another embodiment of the present disclosure.

FIG. 6 is a schematic flowchart of another multi-connectivity communication method according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

Step 601: A secondary base station receives a first RRC message generated by an RRC entity of an anchor base station and an RRC entity of the secondary base station generates a second RRC message.

Step 602: The secondary base station sends the first RRC message and the second RRC message to a terminal via an air interface between the secondary base station and the terminal, where the first RRC message is encapsulated by the secondary base station into an RRC container, so as to determine, when the terminal parses out the first RRC message from the RRC container, that the first RRC message is generated by the RRC entity of the anchor base station; the anchor base station and the secondary base station use different radio access technologies.

Figure 7:
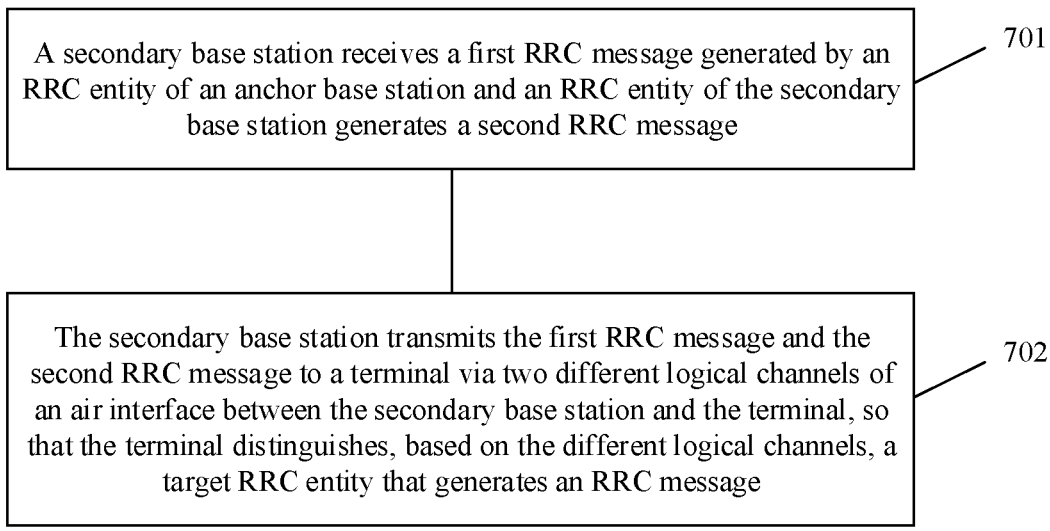
FIG. 7 is a schematic flowchart of another multi-connectivity communication method according to another embodiment of the present disclosure.

FIG. 7 is a schematic flowchart of another multi-connectivity communication method according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

Step 701: A secondary base station receives a first RRC message generated by an RRC entity of an anchor base station and an RRC entity of the secondary base station generates a second RRC message.

Step 702: The secondary base station transmits the first RRC message and the second RRC message to a terminal via two different logical channels of an air interface between the secondary base station and the terminal, so that the terminal distinguishes, based on the different logical channels, a target RRC entity that generates an RRC message, where the target RRC entity is the RRC entity of the anchor base station or the RRC entity of the secondary base station, and the anchor base station and the secondary base station use different radio access technologies.

Optionally, the method further includes: establishing, by the secondary base station, two different SRBs (signaling radio bearer, signaling bearer, mainly used to carry a signaling message) corresponding to the two different logical channels; and sending, by the secondary base station, correspondences between configuration information of the two different SRBs and the RRC entities that correspondingly generate the RRC messages to the terminal.

Optionally, the two different SRBs include a first SRB and a second SRB, where the first SRB is used to transmit the first RRC message, and the second SRB is used to transmit the second RRC message; and the sending, by the secondary base station, correspondences between configuration information of the two different SRBs and the RRC entities that correspondingly generate the RRC messages to the terminal specifically includes:

sending, by the secondary base station, a correspondence between configuration information of the first SRB and the RRC entity of the anchor base station to the anchor base station via an interface between the anchor base station and the secondary base station, so that the anchor base station sends the correspondence to the terminal via an air interface between the anchor base station and the terminal; and sending, by the secondary base station, a correspondence between configuration information of the second SRB and the RRC entity of the secondary base station to the terminal via the air interface between the secondary base station and the terminal.

Figure 8:
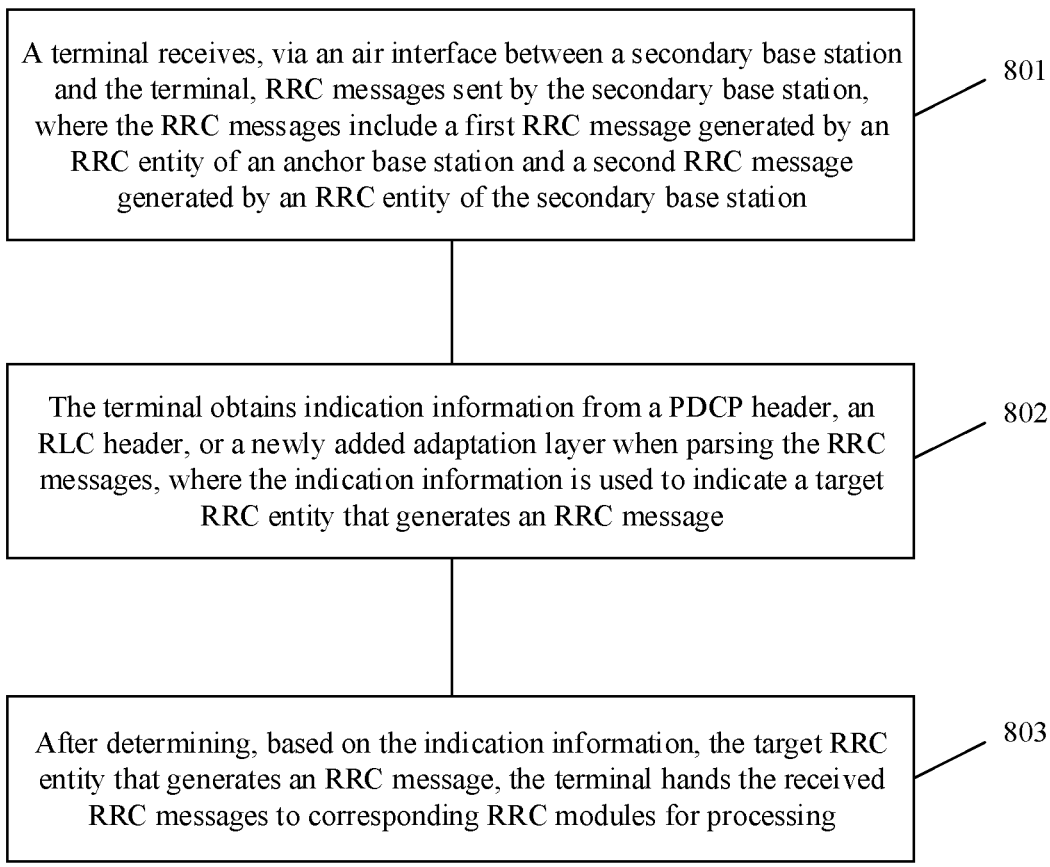
FIG. 8 is a schematic flowchart of another multi-connectivity communication method according to another embodiment of the present disclosure.

FIG. 8 is a schematic flowchart of another multi-connectivity communication method according to another embodiment of the present disclosure. In this embodiment, description is provided from a terminal side. If an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

Step 801: A terminal receives, via an air interface between a secondary base station and the terminal, RRC messages sent by the secondary base station, where the RRC messages include a first RRC message generated by an RRC entity of an anchor base station and a second RRC message generated by an RRC entity of the secondary base station.

Step 802: The terminal obtains indication information from a PDCP header, an RLC header, or a newly added adaptation layer when parsing the RRC messages, where the indication information is used to indicate a target RRC entity that generates an RRC message.

Step 803: After determining, based on the indication information, the target RRC entity that generates an RRC message, the terminal hands the received RRC messages to corresponding RRC modules for processing, where the target RRC entity is the RRC entity of the anchor base station or the RRC entity of the secondary base station, and the anchor base station and the secondary base station use different radio access technologies.

Optionally, the indication information is carried by using an idle field in the PDCP header, or by adding a new field to the PDCP header.

Optionally, the indication information includes first indication information and second indication information, where the first indication information is used to indicate that the target RRC entity is the RRC entity of the anchor base station, and the second indication information is used to indicate that the target RRC entity is the RRC entity of the secondary base station.

Optionally, the first indication information is added by the anchor base station to a PDCP header of the anchor base station, and is sent to the secondary base station via an interface between the anchor base station and the secondary base station; and the second indication information is added by the secondary base station to a PDCP header of the secondary base station.

Optionally, the first indication information and the second indication information are added by the secondary base station to an RLC header of the secondary base station.

Optionally, the method further includes: receiving, by the terminal via the air interface between the secondary base station and the terminal, a correspondence between the first indication information and the RRC entity of the anchor base station and a correspondence between the second indication information and the RRC entity of the secondary base station, where the correspondences are sent by the secondary base station.

Optionally, the first indication information is added by the anchor base station to a newly added adaptation layer of the anchor base station, is sent to the secondary base station via an interface between the anchor base station and the secondary base station, and then is sent by the secondary base station to the terminal via the air interface between the secondary base station and the terminal; and the second indication information is added by the secondary base station to a newly added adaptation layer of the secondary base station, and then is sent by the secondary base station to the terminal via the air interface between the secondary base station and the terminal.

Optionally, the terminal receives the first indication information and the second indication information via the air interface between the secondary base station and the terminal.

Optionally, a correspondence between the first indication information and the RRC entity of the anchor base station is sent by the anchor base station to the terminal via an air interface between the anchor base station and the terminal, and the method further includes: receiving, by the terminal via the air interface between the secondary base station and the terminal, a correspondence that is between the second indication information and the RRC entity of the secondary base station and that is sent by the secondary base station.

Optionally, the secondary base station is capable of transmitting the RRC message generated by the RRC entity of the anchor base station, and is capable of directly transmitting the RRC message generated by the RRC entity of the secondary base station.

Figure 9:
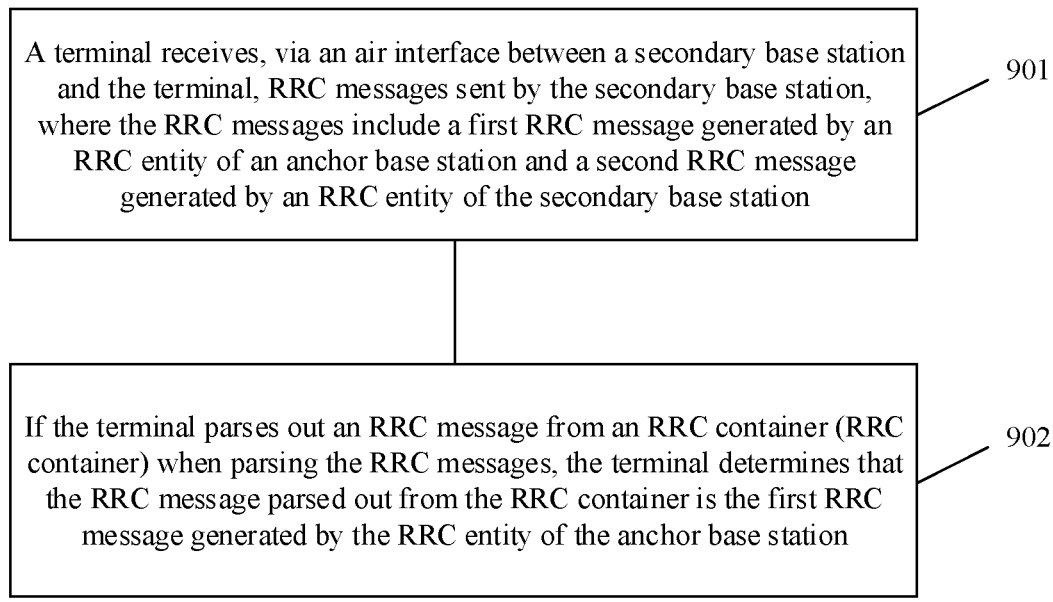
FIG. 9 is a schematic flowchart of another multi-connectivity communication method according to another embodiment of the present disclosure.

FIG. 9 is a schematic flowchart of another multi-connectivity communication method according to another embodiment of the present disclosure. In this embodiment, description is provided from a terminal side. If an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

Step 901: A terminal receives, via an air interface between a secondary base station and the terminal, RRC messages sent by the secondary base station, where the RRC messages include a first RRC message generated by an RRC entity of an anchor base station and a second RRC message generated by an RRC entity of the secondary base station.

Step 902: If the terminal parses out an RRC message from an RRC container when parsing the RRC messages, the terminal determines that the RRC message parsed out from the RRC container is the first RRC message generated by the RRC entity of the anchor base station, where the anchor base station and the secondary base station use different radio access technologies.

A multi-connectivity communication method is provided, including:

receiving, by a terminal via different logical channels of an air interface between a secondary base station and the terminal, RRC messages sent by the secondary base station, where the RRC messages include a first RRC message generated by an RRC entity of an anchor base station and a second RRC message generated by an RRC entity of the secondary base station; and distinguishing, by the terminal based on the different logical channels, a target RRC entity that generates an RRC message.

The target RRC entity is the RRC entity of the anchor base station or the RRC entity of the secondary base station, and the anchor base station and the secondary base station use different radio access technologies.

Optionally, the method further includes: receiving, by the terminal, configuration information of two different SRBs, where the configuration information of the two different SRBs corresponds to the two different logical channels, and includes correspondences between the configuration information of the SRBs and the RRC entities that correspondingly generate the RRC messages.

Optionally, the two different SRBs include a first SRB and a second SRB, where the first SRB is used to transmit the first RRC message, and the second SRB is used to transmit the second RRC message.

A correspondence between configuration information of the first SRB and the RRC entity of the anchor base station is sent by the secondary base station to the anchor base station via an interface between the anchor base station and the secondary base station, and the method further includes:

receiving, by the terminal, the correspondence that is between the configuration information of the first SRB and the RRC entity of the anchor base station and that is sent by the anchor base station via an air interface between the anchor base station and the terminal; and receiving, by the terminal, a correspondence that is between configuration information of the second SRB and the RRC entity of the secondary base station and that is sent by the secondary base station via the air interface between the secondary base station and the terminal.

Figure 10:
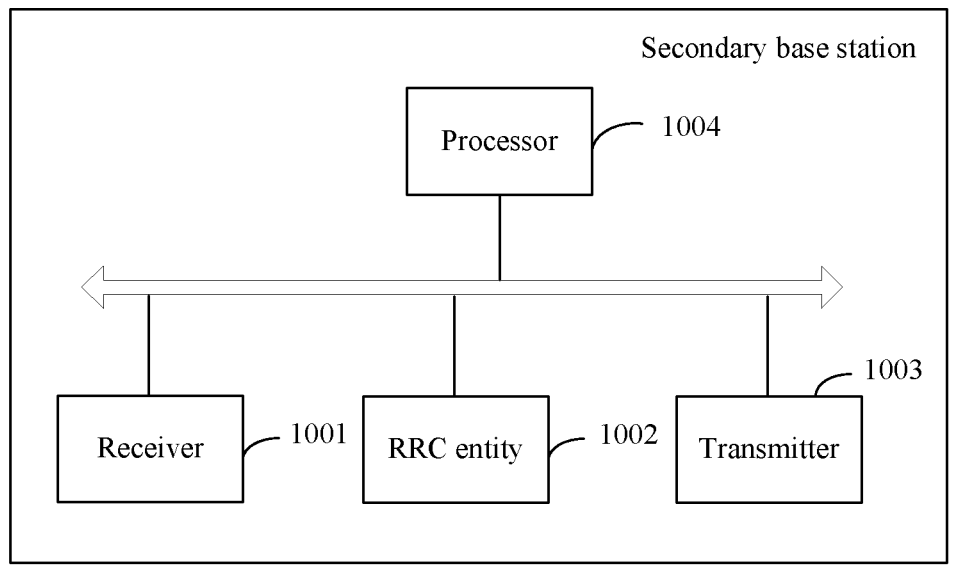
FIG. 10 is a schematic structural diagram of a secondary base station according to another embodiment of the present disclosure.

FIG. 10 is a schematic structural diagram of a secondary base station according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

The secondary base station includes: a receiver 1001, an RRC entity 1002, a transmitter 1003, and a processor 1004.

The receiver 1001 is configured to receive a first RRC message generated by an RRC entity of an anchor base station.

The RRC entity 1002 is configured to generate a second RRC message.

The transmitter 1003 is configured to send the first RRC message and the second RRC message to a terminal via an air interface between the secondary base station and the terminal, where a PDCP header, an RLC header, or a newly added adaptation layer carries indication information, and the indication information is used to indicate a target RRC entity that generates an RRC message. The target RRC entity is the RRC entity of the anchor base station or the RRC entity of the secondary base station, and the anchor base station and the secondary base station use different radio access technologies.

Optionally, the indication information is carried by using an idle field in the PDCP header, or by adding a new field to the PDCP header.

Optionally, the indication information includes first indication information and second indication information, where the first indication information is used to indicate that the target RRC entity is the RRC entity of the anchor base station, and the second indication information is used to indicate that the target RRC entity is the RRC entity of the secondary base station.

Optionally, the first indication information is added by the anchor base station to a PDCP header of the anchor base station, and is sent to the secondary base station via an interface between the anchor base station and the secondary base station; and the secondary base station further includes: the processor 1004, configured to add the second indication information to a PDCP header of the secondary base station.

Optionally, the secondary base station further includes: the processor 1004, configured to add the first indication information and the second indication information to an RLC header of the secondary base station.

Optionally, the transmitter 1003 is further configured to send a correspondence between the first indication information and the RRC entity of the anchor base station and a correspondence between the second indication information and the RRC entity of the secondary base station to the terminal via the air interface between the secondary base station and the terminal.

Optionally, the first indication information is added by the anchor base station to a newly added adaptation layer of the anchor base station, and is sent to the secondary base station via an interface between the anchor base station and the secondary base station; and the secondary base station further includes: the processor 1004, configured to add the second indication information to a newly added adaptation layer of the secondary base station.

Optionally, a correspondence between the first indication information and the RRC entity of the anchor base station is sent by the anchor base station to the terminal via an air interface between the anchor base station and the terminal, and the transmitter 1003 is further configured to send a correspondence between the second indication information and the RRC entity of the secondary base station to the terminal via the air interface between the secondary base station and the terminal.

Optionally, the transmitter 1003 is further configured to send uplink grant (UL grant) information to the anchor base station via an interface between the anchor base station and the secondary base station, so that the anchor base station sends the RRC message generated by the RRC entity of the anchor base station to the terminal and the anchor base station instructs the terminal to establish an RRC connection to the secondary base station.

Optionally, the transmitter 1003 is further configured to send a random access response message including uplink grant (UL grant) information to the terminal, to indicate that the terminal establishes an RRC connection to the secondary base station.

Optionally, the secondary base station is capable of transmitting the RRC message generated by the RRC entity of the anchor base station, and is capable of directly transmitting the RRC message generated by the RRC entity of the secondary base station.

Figure 11:
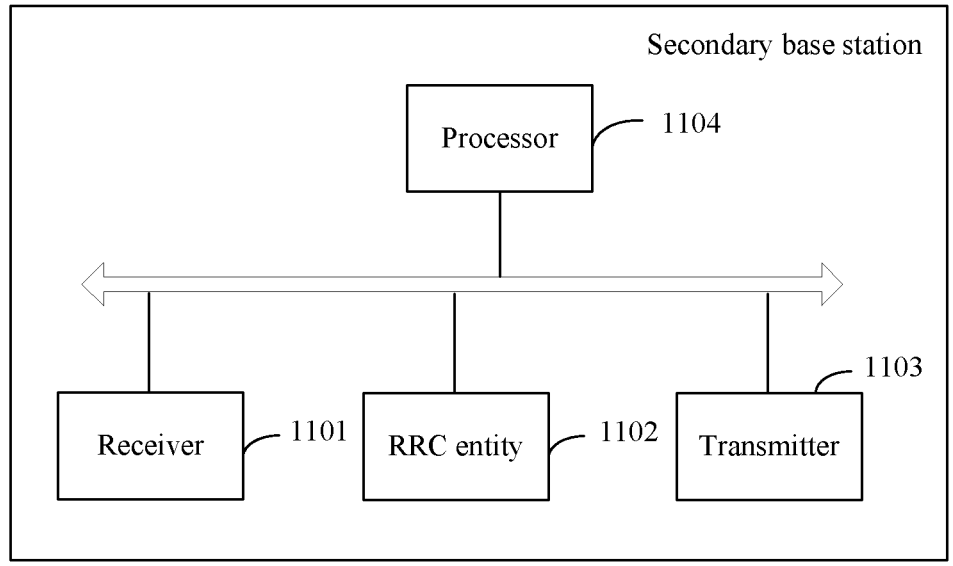
FIG. 11 is a schematic structural diagram of another secondary base station according to another embodiment of the present disclosure.

FIG. 11 is a schematic structural diagram of a secondary base station according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

The secondary base station includes: a receiver 1101, configured to receive a first RRC message generated by an RRC entity of an anchor base station; an RRC entity 1102, configured to generate a second RRC message; a transmitter 1103, configured to send the first RRC message and the second RRC message to a terminal via an air interface between the secondary base station and the terminal; and a processor 1104, configured to encapsulate the first RRC message into an RRC container, so as to determine, when the terminal parses out the first RRC message from the RRC container, that the first RRC message is generated by the RRC entity of the anchor base station. The anchor base station and the secondary base station use different radio access technologies.

Figure 12:
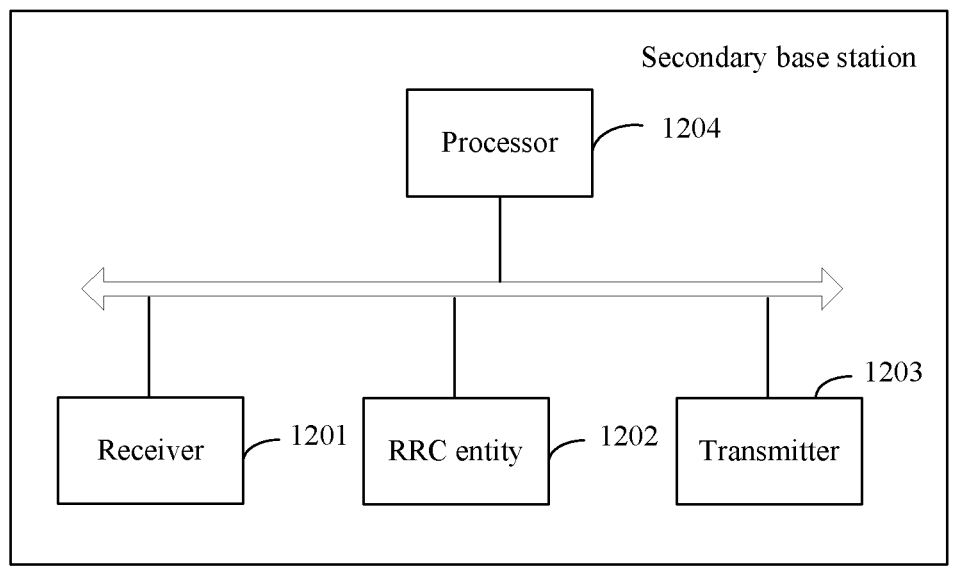
FIG. 12 is a schematic structural diagram of another secondary base station according to another embodiment of the present disclosure.

FIG. 12 is a schematic structural diagram of a secondary base station according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

The secondary base station includes: a receiver 1201, configured to receive a first RRC message generated by an RRC entity of an anchor base station; an RRC entity 1202, configured to generate a second RRC message; and a transmitter 1203, configured to transmit the first RRC message and the second RRC message to a terminal via two different logical channels of an air interface between the secondary base station and the terminal, so that the terminal distinguishes, based on the different logical channels, a target RRC entity that generates an RRC message. The target RRC entity is the RRC entity of the anchor base station or the RRC entity of the secondary base station, and the anchor base station and the secondary base station use different radio access technologies.

Optionally, the secondary base station further includes: a processor 1204, configured to establish two different SRBs corresponding to the two different logical channels.

The transmitter 1203 is further configured to send correspondences between configuration information of the two different SRBs and the RRC entities that correspondingly generate the RRC messages to the terminal.

Optionally, the two different SRBs include a first SRB and a second SRB, where the first SRB is used to transmit the first RRC message, and the second SRB is used to transmit the second RRC message. The transmitter 1203 is further configured to send a correspondence between configuration information of the first SRB and the RRC entity of the anchor base station to the anchor base station via an interface between the anchor base station and the secondary base station, so that the anchor base station sends the correspondence to the terminal via an air interface between the anchor base station and the terminal. The transmitter 1203 is further configured to send a correspondence between configuration information of the second SRB and the RRC entity of the secondary base station to the terminal via the air interface between the secondary base station and the terminal.

Figure 13:
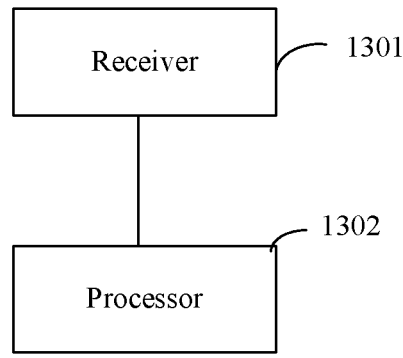
FIG. 13 is a schematic structural diagram of a terminal according to another embodiment of the present disclosure.

FIG. 13 is a schematic structural diagram of a terminal according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

The terminal includes: a receiver 1301, configured to receive, via an air interface between a secondary base station and the terminal, RRC messages sent by the secondary base station, where the RRC messages include a first RRC message generated by an RRC entity of an anchor base station and a second RRC message generated by an RRC entity of the secondary base station; a processor 1302, configured to obtain indication information from a PDCP header, an RLC header, or a newly added adaptation layer when parsing the RRC messages, where the indication information is used to indicate a target RRC entity that generates an RRC message; and configured to hand the received RRC messages to corresponding RRC modules for processing after the target RRC entity that generates an RRC message is determined based on the indication information, where the target RRC entity is the RRC entity of the anchor base station or the RRC entity of the secondary base station, and the anchor base station and the secondary base station use different radio access technologies.

Optionally, the indication information is carried by using an idle field in the PDCP header, or by adding a new field to the PDCP header.

Optionally, the indication information includes first indication information and second indication information, where the first indication information is used to indicate that the target RRC entity is the RRC entity of the anchor base station, and the second indication information is used to indicate that the target RRC entity is the RRC entity of the secondary base station.

Optionally, the first indication information is added by the anchor base station to a PDCP header of the anchor base station, and is sent to the secondary base station via an interface between the anchor base station and the secondary base station; and the second indication information is added by the secondary base station to a PDCP header of the secondary base station.

Optionally, the first indication information and the second indication information are added by the secondary base station to an RLC header of the secondary base station.

Optionally, the receiver 1301 is further configured to receive, via the air interface between the secondary base station and the terminal, a correspondence between the first indication information and the RRC entity of the anchor base station and a correspondence between the second indication information and the RRC entity of the secondary base station, where the correspondences are sent by the secondary base station.

Optionally, the first indication information is added by the anchor base station to a newly added adaptation layer of the anchor base station, and is sent to the secondary base station via an interface between the anchor base station and the secondary base station; and the second indication information is added by the secondary base station to a newly added adaptation layer of the secondary base station. The receiver 1301 is further configured to receive the first indication information and the second indication information from the secondary base station via the air interface between the secondary base station and the terminal.

Optionally, the receiver 1301 is further configured to receive, via the air interface between the secondary base station and the terminal, a correspondence that is between the second indication information and the RRC entity of the secondary base station and that is sent by the secondary base station.

Optionally, the secondary base station is capable of transmitting the RRC message generated by the RRC entity of the anchor base station, and is capable of directly transmitting the RRC message generated by the RRC entity of the secondary base station.

Figure 14:
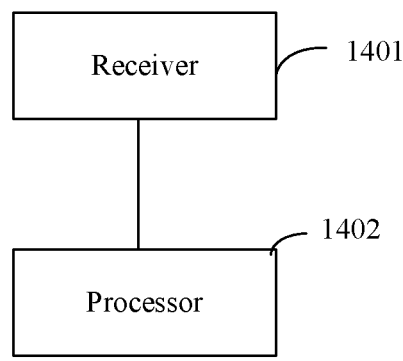
FIG. 14 is a schematic structural diagram of another terminal according to another embodiment of the present disclosure.

FIG. 14 is a schematic structural diagram of a terminal according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

The terminal includes: a receiver 1401, configured to receive, via an air interface between a secondary base station and the terminal, RRC messages sent by the secondary base station, where the RRC messages include a first RRC message generated by an RRC entity of an anchor base station and a second RRC message generated by an RRC entity of the secondary base station; and a processor 1402, configured to: if an RRC message is parsed out from an RRC container when parsing the RRC messages, determine that the RRC message parsed out from the RRC container is the first RRC message generated by the RRC entity of the anchor base station. The anchor base station and the secondary base station use different radio access technologies.

Figure 15:
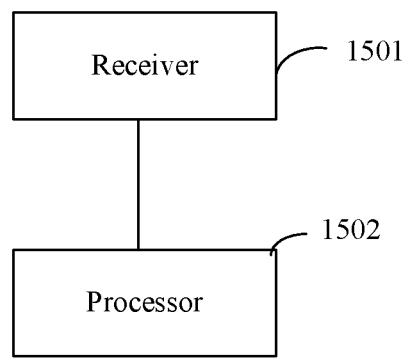
FIG. 15 is a schematic structural diagram of another terminal according to another embodiment of the present disclosure.

FIG. 15 is a schematic structural diagram of another terminal according to another embodiment of the present disclosure. In this embodiment, if an LTE eNB is an anchor base station or a master base station (MeNB, master eNB), an NR gNB is a secondary base station (SgNB, Secondary gNB). Alternatively, if an NR gNB is an anchor base station or a master base station (MgNB, Master gNB), an LTE eNB is a secondary base station (SeNB, Secondary eNB). Main description is provided below.

The terminal includes: a receiver 1501, configured to receive, via different logical channels of an air interface between a secondary base station and the terminal, RRC messages sent by the secondary base station, where the RRC messages include a first RRC message generated by an RRC entity of an anchor base station and a second RRC message generated by an RRC entity of the secondary base station; and a processor 1502, configured to distinguish, based on the different logical channels, a target RRC entity that generates an RRC message. The target RRC entity is the RRC entity of the anchor base station or the RRC entity of the secondary base station, and the anchor base station and the secondary base station use different radio access technologies.

Optionally, the receiver 1501 is further configured to receive configuration information of two different SRBs, where the configuration information of the two different SRBs corresponds to the two different logical channels, and includes correspondences between the configuration information of the SRBs and the RRC entities that correspondingly generate the RRC messages.

Optionally, the two different SRBs include a first SRB and a second SRB, where the first SRB is used to transmit the first RRC message, and the second SRB is used to transmit the second RRC message.

A correspondence between configuration information of the first SRB and the RRC entity of the anchor base station is sent by the secondary base station to the anchor base station via an interface between the anchor base station and the secondary base station. The receiver 1501 is further configured to receive a correspondence that is between the configuration information of the first SRB and the RRC entity of the anchor base station and that is sent by the anchor base station via an air interface between the anchor base station and the terminal.

The receiver 1501 is further configured to receive a correspondence that is between configuration information of the second SRB and the RRC entity of the secondary base station and that is sent by the secondary base station via the air interface between the secondary base station and the terminal.

Figure 16:
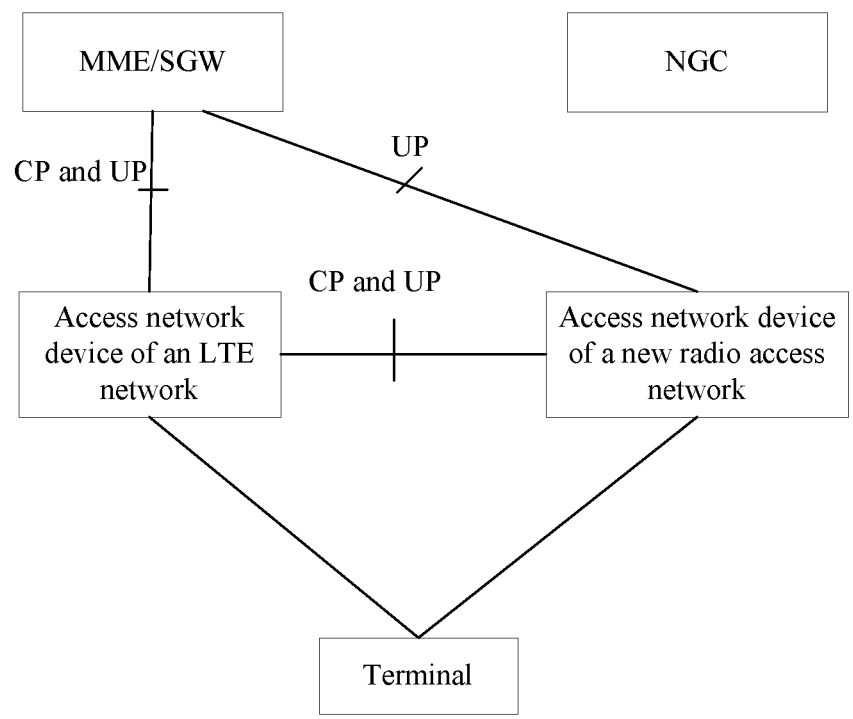
FIG. 16 is a schematic diagram of a multi-connectivity network architecture applicable to an embodiment of the present disclosure.

As shown in FIG. 16, an example in which a first network is an LTE network and a new radio access network is a 5G network is used. FIG. 16 is a schematic diagram of a multi-connectivity network architecture applicable to an embodiment of the present disclosure. As shown in FIG. 16, the multi-connectivity network architecture shown in FIG. 16 includes an access network device of the LTE network, an access network device of the new radio access network, and a core network device of the LTE network. The access network device of the LTE network includes an LTE eNB, the access network device of the new radio access network includes an NR gNB, and the core network device of LTE includes: a mobility management entity (MME for short) or a serving gateway (S-GW for short). A function of the access network device of the new radio access network is similar to a function of the access network device of the LTE network, and both the access network devices can provide functions such as security authentication, charging, and mobility management for a terminal. An interface between the access network device of the LTE network and the access network device of the new radio access network is a new interface, and the new interface may be referred to as an X5 interface or the like. This is not limited herein. There are only two connections in the example shown in FIG. 16: a connection between the terminal and the access network device of the new radio access network, and a connection that is between the terminal and the access network device of the new radio access network via the access network device of the LTE network. Certainly, the terminal may alternatively establish more connections by using the access network device of the LTE network.

In this embodiment, the LTE eNB is used as an anchor base station or a master base station (MeNB, master eNB), and the NR gNB is used as a secondary base station (SgNB, Secondary gNB) to perform multi-connectivity data transmission in which the LTE eNB is used as an anchor.

During the multi-connectivity data transmission, data may be split at a PDCP layer of the LTE eNB or an RLC protocol layer of the LTE eNB. This is not limited in this embodiment.

Figure 17:
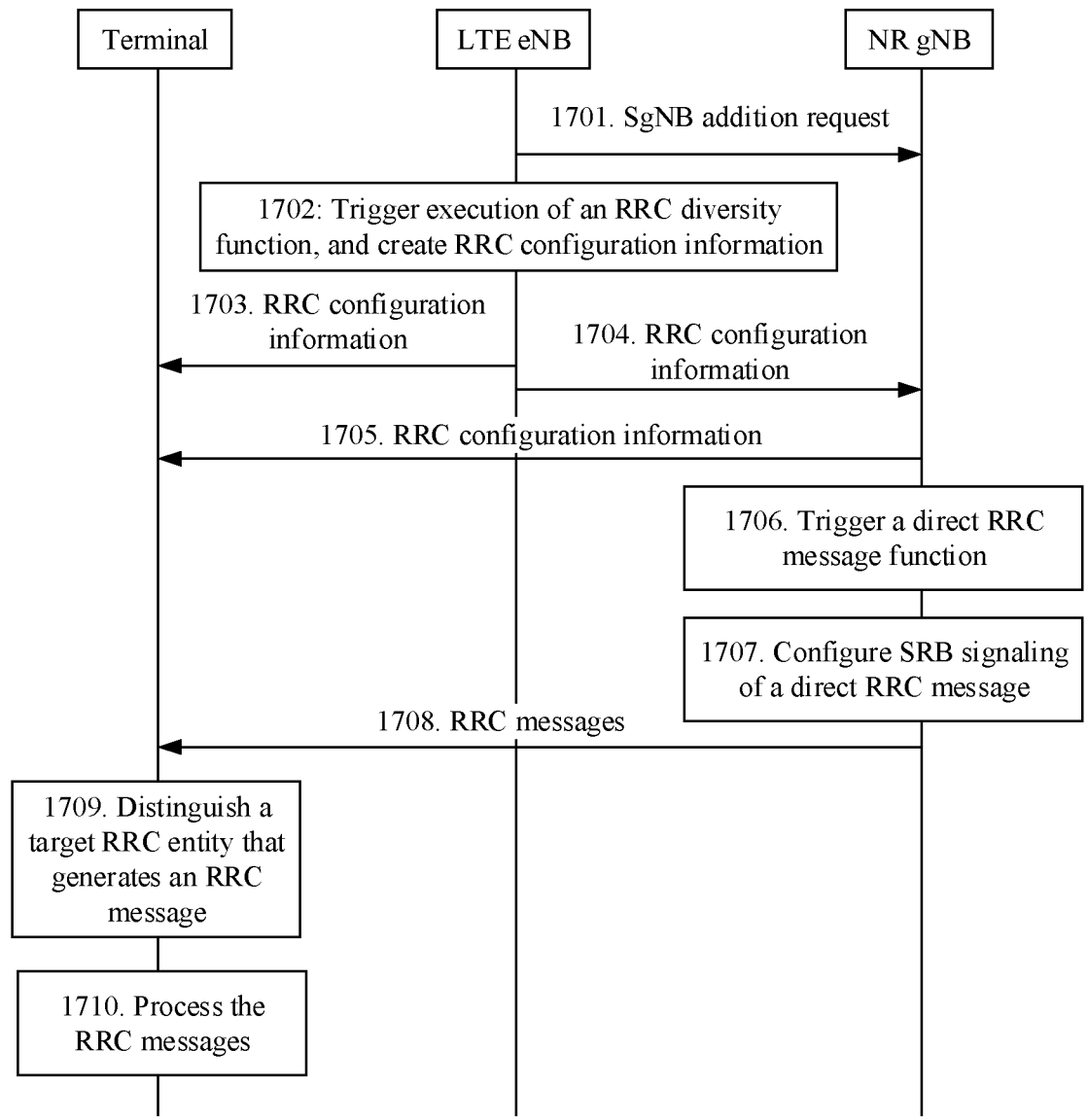
FIG. 17 is a schematic flowchart of another multi-connectivity communication method according to another embodiment of the present disclosure.

FIG. 17 is a schematic flowchart of a multi-connectivity communication method according to another embodiment of the present disclosure. In this embodiment, an LTE eNB is an anchor base station or a master base station, and an NR gNB is a secondary base station. Main description is provided below.

Step 1701: The LTE eNB initiates an addition request procedure to the NR gNB, to trigger a multi-connectivity process.

In the multi-connectivity process, the LTE eNB may be used as the MeNB to initiate the addition request procedure to the NR gNB, namely, the secondary base station (SgNB), to trigger LTE-NR multi-connectivity data transmission (LTE-NR tight interworking).

The addition request procedure is similar to LTE DC. For example, the LTE eNB serves as the anchor base station to initiate an SgNB addition request to the secondary base station NR gNB. The SgNB addition request is used to request the NR gNB, serving as the secondary base station, to create a corresponding connectivity resource. The addition request message includes at least one of the following information: information related to a data radio bearer (for example, an ERAB ID), security-related information (for example, a key), information related to a signaling bearer (such as a signaling radio bearer identifier (SRB ID)), a corresponding tunnel endpoint identifier (TEID), and corresponding quality of service (QoS).

After receiving the request message, the NR gNB returns a response message to the MeNB. The response message includes the received information related to a data radio bearer, the received information related to a signaling bearer, the corresponding received tunnel endpoint, and the like. The NR gNB reserves a corresponding resource for the terminal, creates a corresponding SRB, and sends related configuration information to the terminal by using an RRC message of the MeNB. The configuration information includes at least one of the following: a configuration related to a signaling radio bearer (for example, an SRB ID), a bearer-related configuration (for example, a DRB ID), an RLC configuration, a PDCP configuration, and the like.

Step 1702: The LTE eNB triggers execution of an RRC diversity function and creates RRC configuration information.

For example, the RRC diversity function is radio resource control (RRC) diversity. That is, an RRC message generated by the LTE eNB may be separately transmitted to the terminal via an LTE air interface and an NR air interface. In other words, an RRC message generated by the LTE eNB is transmitted to the terminal via an LTE air interface; and may be alternatively transmitted to the NR gNB via an interface between the LTE eNB and the NR gNB and then transmitted by the NR gNB to the terminal. The LTE eNB triggers execution of the RRC diversity function, and the LTE eNB creates the RRC configuration information.

Step 1703 to Step 1705: The LTE eNB separately sends the RRC configuration information to the terminal by using the LTE eNB and the NR gNB.

For example, the LTE eNB separately sends the RRC configuration information to the terminal by using the LTE eNB and the NR gNB.

In the SgNB addition procedure, an RRC diversity configuration may include adding information related to a to-be-split SRB to the addition request message in an SRB splitting (split SRB) manner, for example, information related to a signaling bearer (SRB ID). After receiving the request message, the NR gNB reserves a resource and creates a corresponding SRB. The NR gNB delivers, in the response message, configuration information of the SRB to the terminal by using the RRC message of the LTE eNB.

Step 1706: The NR gNB triggers a direct RRC message function.

The direct RRC message function is as follows: The NR gNB, when serving as the secondary base station, directly generates an RRC message, and transmits the RRC message to the terminal via an NR air interface. The direct RRC message function of the NR gNB is mainly triggered in the following two manners.

Manner 1: The LTE eNB determines whether the NR gNB has a direct RRC function.

If the LTE eNB determines that the NR gNB has the direct RRC function, the NR gNB sends uplink grant (UL grant) information to the LTE eNB via an interface between the NR gNB and the LTE eNB; and then the LTE eNB sends, via the LTE air interface, the RRC message generated by the LTE eNB to the terminal, and instructs the terminal to establish an RRC connection to the NR gNB. The terminal initiates an RRC connection establishment request to the NR gNB based on the instruction, and then the terminal establishes an RRC connection to the NR gNB.

For example, the NR gNB sends the UL grant information carried in an addition request acknowledge (addition request ACK) message or another message to the LTE eNB This is not limited in this embodiment.

In another embodiment of the present disclosure, the UL grant information may also be requested in the addition request message by the LTE eNB from the NR gNB. This is not limited in this embodiment.

Manner 2: The NR gNB determines whether the NR gNB has a direct RRC function.

If the NR gNB determines that the NR gNB has the direct RRC function, a random access message sent by the NR gNB to the terminal carriers UL grant information, to indicate that the terminal establishes an RRC connection to the NR gNB. The NR gNB does not need to send the UL grant information to the terminal by using the LTE eNB. The terminal initiates an RRC connection establishment request to the NR gNB based on the instruction, and then the terminal establishes an RRC connection with the NR gNB.

A manner in which the terminal establishes an RRC connection with the NR gNB is similar to an existing manner of establishing an LTE RRC connection. Details are not described in the present disclosure.

Step 1707: The NR gNB configures SRB signaling of a direct RRC message.

After SgNB addition, when the NR gNB has a configuration change requirement (for example, a bearer needs to be modified or released), the NR gNB triggers creation of an SRB. A configuration of the SRB includes a PDCP configuration (PDCP config), an RLC configuration (RLC config (optional)), or the like. An SRB configuration transmission manner may be as follows.

Manner 1: If a split SRB (RRC diversity) is already configured in the SgNB addition process, the NR gNB directly transmits an RRC message to the terminal by using the split SRB.

Manner 2: The NR gNB transmits an RRC message to the terminal by using a default bearer (an SRB 0), where the SRB 0 between the terminal and the NR gNB has been established during random access.

Manner 3: The NR gNB sends the configuration of the SRB to the LTE eNB, and sends the configuration of the SRB to the terminal by using the RRC message of the LTE eNB.

Step 1708: The NR gNB sends RRC messages to the terminal.

Optionally, the RRC messages sent by the NR gNB to the terminal include an RRC message generated by an RRC entity of the LTE eNB and an RRC message generated by an RRC entity of the NR gNB. If the NR gNB needs to transmit the RRC message generated by the RRC entity of the LTE eNB and the RRC message generated by the RRC entity of the NR gNB to the terminal, the NR gNB may indicate a target RRC entity that generates an RRC message. Optionally, the RRC message sent by the NR gNB to the terminal may also be an RRC diversity RRC message that is generated by the RRC entity of the LTE eNB and that is received by the NR gNB from the LTE eNB.

Optionally, the RRC message sent by the NR gNB to the terminal may also be a direct RRC message that is generated by the RRC entity of the NR gNB.

Optionally, the RRC messages include the RRC diversity RRC message received by the NR gNB from the LTE eNB and the direct RRC message of the NR gNB, and a manner in which the NR gNB indicates the target RRC entity that generates an RRC message is described below.

Manner 1: A PDCP header, an RLC header, or a newly added adaptation layer carrying an RRC message includes indication information, and the indication information is used to indicate the target RRC entity that generates an RRC message.

Manner 2: The NR gNB encapsulates the RRC message generated by the RRC entity of the LTE eNB into an RRC container of the NR RRC message, and transmits the RRC message to the terminal by using the SRB created by the NR gNB.

Manner 3: The NR gNB transmits the LTE RRC message and the NR RRC message to the terminal by using different logical channels. For example, the NR gNB creates two SRBs, one is used to transmit the RRC message generated by the RRC entity of the LTE eNB, and the other is used to transmit the message generated by the RRC entity of the NR gNB.

Step 1709: After receiving an RRC signaling message transmitted by using an SRB, an NR module of the terminal distinguishes whether the target RRC entity that generates an RRC messagebelongs to the LTE eNB or the NR gNB.

Manners in which the terminal distinguishes whether the target RRC entity that generates an RRC message belongs to the LTE eNB or the NR gNB are also different depending on different RRC message sending manners. Main description is provided below.

Distinguishing manner 1: A PDCP header, an RLC header, or a newly added adaptation layer carrying an RRC message includes indication information, and the indication information is used to indicate the target RRC entity that generates an RRC message. Main description is provided below.

Option 1: The indication information included in the PDCP header carrying an RRC message indicates the target RRC entity that generates an RRC message.

For an RRC diversity function, the RRC message generated by the LTE RRC entity is processed at an LTE PDCP layer and transmitted to an NR RLC layer for processing, and then separately processed at an NR MAC layer and an NR PHY layer and sent to the terminal via the NR air interface. When processing is performed at the LTE PDCP layer, a piece of indication information is added to an LTE PDCP header, and is used to indicate, for distinguishing purpose, that the RRC message is generated by the LTE RRC entity. The indication information is optional. The indication information in the LTE PDCP header herein may not be added if indication information is already added to an NR PDCP header during execution of the direct RRC function.

For the direct RRC function, the RRC message generated by the NR RRC entity is processed at an NR PDCP layer and transmitted to an NR RLC layer for processing, and then separately processed at an NR MAC layer and an NR PHY layer and sent to the terminal via the NR air interface. When processing is performed at the NR PDCP layer, a piece of indication information is added to a PDCP header, and is used to indicate, for distinguishing purpose, that the RRC message is generated by the NR RRC entity. The indication information is optional. The indication information in the NR PDCP header herein may not be added if indication information is already added to an LTE PDCP header during execution of the RRC diversity function.

For example, the indication information may be carried by using an idle field in the LTE PDCP header, for example, carried by using a C/D domain field, or by adding a new field to the LTE PDCP header.

Optionally, a correspondence between the indication information and the LTE eNB needs to be notified to the terminal. For example, the correspondence may be carried by using the RRC message of the LTE eNB and is sent to the terminal via the LTE air interface.

After an RRC entity generates an RRC message, the RRC message is separately processed at a PDCP layer, an RLC layer, a MAC layer, and a PHY layer, in other words, a PDCP header, an RLC header, a MAC header, and a PHY header are added, and then transmitted to the terminal via an air interface. For execution of the RRC diversity function, the RRC message generated by the RRC entity of the LTE eNB is first processed at the LTE PDCP layer, in other words, the LTE PDCP header is added; then is transmitted to the NR RLC layer for processing, in other words, an NR RLC header is added; then is transmitted to the NR MAC layer for processing, in other words, an NR MAC header is added; then is transmitted to the NR PHY layer for processing, in other words, a PHY header is added; and finally is transmitted to the terminal via the NR air interface. For execution of the function of transferring a direct RRC message by the NR gNB itself, similarly, the RRC message generated by the RRC entity of the NR gNB is first processed at the NR PDCP layer, in other words, the NR PDCP header is added; then is transmitted to the NR RLC layer for processing, in other words, an NR RLC header is added; then is transmitted to the NR MAC layer for processing, in other words, an NR MAC header is added; then is transmitted to the NR PHY layer for processing, in other words, a PHY header is added; and finally is transmitted to the terminal via the NR air interface. When performing parsing, based on protocol layers, the terminal first parses out a PHY header, and then sequentially parses out a MAC header, an RLC header, a MAC header, and a PDCP header, and finally receives an RRC message.

A structure of the RRC message transmitted by the NR gNB to the terminal may be shown in Table 1.

TABLE 1

| NR PHY | NR MAC | NR RLC | PDCP | RRC |
| --- | --- | --- | --- | --- |

The RRC message generated by the RRC entity of the NR gNB is transmitted to the terminal via the NR air interface. The NR gNB adds a piece of indication information to the NR PDCP header of the NR gNB, and the indication information is used to indicate a source of the RRC message received by the terminal via the NR air interface, that is, the target RRC entity that generates an RRC message is the RRC entity of the NR gNB, namely, a entity for executing the direct RRC function.

Optionally, a correspondence between the indication information and the NR gNB needs to be notified to the terminal. For example, the correspondence may be carried by using the RRC message of the NR gNB and is sent to the terminal via the NR air interface.

After receiving the RRC message transmitted via the NR air interface, the NR module of the terminal parses out a PDCP header after separately parsing out a PHY header, a MAC header, and an RLC header. The PDCP header may be either the LTE PDCP header or the NR PDCP header. If indication information included in the PDCP header indicates that the target RRC entity belongs to the LTE eNB, the RRC message is handed to a PDCP layer of an LTE module of the terminal for processing. If the target RRC entity indicated by the indication information in the PDCP header belongs to the NR gNB, the RRC message is handed to a PDCP layer of the NR module of the terminal for processing.

Option 2: The indication information included in the RLC header carrying an RRC message indicates the target RRC entity that generates an RRC message.

For the RRC diversity function, the RRC message generated by the LTE RRC entity is processed at an LTE PDCP layer and transmitted to an NR RLC layer for processing, and then separately processed at an NR MAC layer and an NR PHY layer and sent to the terminal via the NR air interface. When processing is performed at the NR RLC layer, a piece of indication information is added to an NR RLC header, and is used to indicate, for distinguishing purpose, that the RRC message is generated by the LTE RRC entity. The indication information is optional. The indication information herein may not be added if indication information is already added to an NR RLC header during execution of the direct RRC function.

For the direct RRC function, the RRC message generated by the NR RRC entity is processed at an NR PDCP layer and transmitted to an NR RLC layer for processing, and then separately processed at an NR MAC layer and an NR PHY layer and sent to the terminal via the NR air interface. When processing is performed at the NR RLC layer, a piece of indication information is added to an NR RLC header, and is used to indicate, for distinguishing purpose, that the RRC message is generated by the NR RRC entity. The indication information is optional. The indication information herein may not be added if indication information is already added to an NR RLC header during execution of the RRC diversity function.

Then the NR gNB transmits the LTE RRC message generated by the RRC entity of the LTE eNB and the RRC message generated by the RRC entity of the NR gNB to the terminal via the NR air interface.

After receiving an RRC message transmitted via the NR air interface, the NR module of the terminal separately parses out a PHY header and a MAC header, and then parses out the NR RLC header. If the target RRC entity indicated by the indication information in the RLC header belongs to the LTE eNB, the RRC message is handed to the PDCP layer of the LTE module of the terminal for processing. If the target RRC entity indicated by the indication information in the PDCP header belongs to the NR gNB, the RRC message is handed to the PDCP layer of the NR module of the terminal for processing. A structure of the RRC message transmitted by the NR gNB to the terminal is shown in Table 1.

According to the format in Table 1, after an RRC entity generates an RRC message, the RRC message is separately processed at a PDCP layer, an RLC layer, a MAC layer, and a PHY layer, in other words, a PDCP header, an RLC header, a MAC header, and a PHY header are added, and then transmitted to the terminal via an air interface. For execution of the RRC diversity function, the RRC message generated by the RRC entity of the LTE eNB is first processed at the LTE PDCP layer, in other words, the LTE PDCP header is added; then is transmitted to the NR RLC layer for processing, in other words, an NR RLC header is added; then is transmitted to the NR MAC layer for processing, in other words, an NR MAC header is added; then is transmitted to the NR PHY layer for processing, in other words, a PHY header is added; and finally is transmitted to the terminal via the NR air interface. For execution of the function of transferring a direct RRC message by the NR gNB itself, similarly, the RRC message generated by the RRC entity of the NR gNB is first processed at the NR PDCP layer, in other words, the NR PDCP header is added; then is transmitted to the NR RLC layer for processing, in other words, an NR RLC header is added; then is transmitted to the NR MAC layer for processing, in other words, an NR MAC header is added; then is transmitted to the NR PHY layer for processing, in other words, a PHY header is added; and finally is transmitted to the terminal via the NR air interface. When performing parsing, based on protocol layers, the terminal first parses out a PHY header, and then sequentially parses out a MAC header, an RLC header, a MAC header, and a PDCP header, and finally receives an RRC message. In the parsing process, the terminal determines a source of the RRC message based on the indication information in NR RLC, or based on the indication information in the PDCP.

Optionally, a correspondence for the indication information needs to be notified to the terminal. For example, the correspondence between the indication information and the LTE eNB and the correspondence between the indication information and the NR gNB may be carried by the RRC message of the NR gNB or another newly added message, and is sent to the terminal via the NR air interface. This is not limited in this embodiment.

After receiving the NR RRC message, the terminal reads the indication information in the RLC header. If the target RRC entity indicated by the indication information included in the RLC header belongs to the LTE eNB, the NR RRC message is handed to the PDCP layer of the LTE module of the terminal for processing. If the target RRC entity indicated by the indication information included in the RCL header belongs to the NR gNB, the NR RRC message is handed to the PDCP layer of the NR module of the terminal for processing.

Option 3: The indication information included in the newly added adaptation layer (adaptation layer) indicates the target RRC entity that generates an RRC message.

An adaptation layer may be newly added to the LTE eNB and the adaptation layer carries the indication information. Alternatively, an adaptation layer may be newly added to the NR gNB and the adaptation layer carries the indication information. This is not limited in this embodiment.

If an adaptation layer is newly added to the LTE eNB, the adaptation layer is newly added between the PDCP layer and the RLC layer of the LTE eNB. A structure is shown in Table 2.

TABLE 2

| LTE PHY | LTE MAC | LTE RLC | Adaptation layer | PDCP | RRC |

If an adaptation layer is newly added to the NR gNB, the adaptation layer is newly added between the PDCP layer and the RLC layer of the NR gNB. A structure is shown in Table 3.

TABLE 3

| NR PHY | NR MAC | NR RLC | Adaptation layer | PDCP | RRC |

If the adaptation layer is added to an LTE eNB side, for an RRC diversity function, the RRC message generated by the LTE RRC entity is first processed at the LTE PDCP layer and transmitted to the adaptation layer, then processed at the adaptation layer and transmitted to the NR RLC layer for processing, and finally processed at the NR MAC layer and the NR PHY layer separately and sent to the terminal via the NR air interface. When processing is performed at the adaptation layer, a piece of indication information is added to a header of the adaptation layer, and is used to indicate, for distinguishing purpose, that the RRC message is generated by the LTE RRC entity. For the direct RRC function, after the NR RRC message is generated, no indication information needs to be added when the NR RRC message is processed at each protocol layer.

If the adaptation layer is added to an NR gNB side, for an RRC diversity function, the RRC message generated by the LTE RRC entity is first processed at the LTE PDCP layer and transmitted to the adaptation layer, then processed at the adaptation layer and transmitted to the NR RLC layer for processing, and finally processed at the NR MAC layer and the NR PHY layer separately and sent to the terminal via the NR air interface. When processing is performed at the adaptation layer, a piece of indication information is added to a header of the adaptation layer, and is used to indicate, for distinguishing purpose, that the RRC message is generated by the LTE RRC entity. When processing is performed at the adaptation layer, indication information may be added to a header of the adaptation layer, and is used to indicate that the RRC message is generated by the LTE RRC entity. For the direct RRC function, the RRC message generated by the NR RRC entity is first processed at the NR PDCP layer and transmitted to the adaptation layer for processing, then processed at the adaptation layer and transmitted to the NR RLC layer for processing, and finally processed at the NR MAC layer and the NR PHY layer separately and sent to the terminal via the NR air interface. When processing is performed at the adaptation layer, a piece of indication information is added to a header of the adaptation layer, and is used to indicate, for distinguishing purpose, that the RRC message is generated by the NR RRC entity. The indication information is optional. The indication information herein may not be added if indication information is already added to the header of the adaptation layer during execution of the RRC diversity function.

Optionally, a correspondence for the indication information needs to be notified to the terminal, the correspondence between the indication information and the LTE eNB may be sent to the terminal by using the RRC message of the LTE eNB via the LTE air interface, and the correspondence between the indication information and the NR gNB may be sent to the terminal by using the RRC message of the NR gNB via the NR air interface.

After receiving the NR RRC message, the terminal parses out the header of the newly added adaptation layer after separately parsing out a PHY header, a MAC header, and an RLC header. If the indication information included in the header of the newly added adaptation layer indicates that the target RRC entity belongs to the LTE eNB, the RRC message is handed to the PDCP layer of the LTE module of the terminal for processing; or if the indication information included in the newly added adaptation layer indicates that the target RRC entity belongs to the NR gNB, the RRC message is handed to the PDCP layer of the NR module of the terminal for processing.

Distinguishing manner 2: The LTE RRC message is encapsulated into an RRC container of the NR air interface, and is transmitted to the terminal by using the SRB created by the NR gNB.

The NR gNB encapsulates, by using the RRC container, the RRC message generated by the LTE RRC entity, and transmits the RRC message to the terminal via the NR air interface. After receiving the NR RRC message, the terminal identifies content of the container in the RRC message. If it is identified that an RRC message in the RRC container is the RRC message generated by the LTE RRC entity, it is determined that the target RRC entity belongs to the LTE eNB, and the RRC message is handed to the PDCP layer of the LTE module of the terminal for processing.

Distinguishing manner 3: The LTE RRC message and the NR RRC message are transmitted by the NR gNB to the terminal by using different logical channels.

In the manner, the NR gNB establishes two different SRBs, and a correspondence between configuration information of the SRBs and the RRC entities that correspondingly generate the RRC messages needs to be sent to the terminal in advance. For example, the RRC message generated by the RRC entity of the NR gNB is sent to the terminal by using one SRB via the NR air interface, and the RRC message generated by the RRC entity of the LTE eNB is sent to the terminal by using the other SRB via the NR air interface. After receiving an RRC message via the NR air interface, the terminal identifies, based on the configuration information of the different SRBs, whether the received RRC message belongs to the RRC entity of the LTE eNB or the RRC entity of the NR gNB. A method for sending the configuration information of the SRBs may be performed in an NR gNB addition process. For example, the NR gNB creates different SRB configurations, and sends related configuration information to the LTE eNB by using a SeNB addition request ACK message, and the LTE eNB sends the related configuration information to the terminal by using the RRC message of the LTE eNB, so as to complete two SRB configurations. Optionally, the configuration information of the SRBs may also be sent to the UE by the LTE eNB or the NR gNB in another manner, for example, by using a new RRC message. This is not limited in the present disclosure.

Step 1710: After determining a source of the RRC message based on the indication information, the NR module of the terminal hands the received RRC messages to corresponding RRC entities for processing.

For example, if the RRC message is generated by the LTE RRC entity, the RRC message received by the terminal is handed to the PDCP layer of the LTE module of the terminal for processing; or if the RRC message is generated by the RRC entity of the NR gNB, the RRC message received by the terminal is handed to the PDCP layer of the NR module of the terminal for processing.

In another embodiment of the present disclosure, if data received by the terminal is split at the RLC layer, the indication information may be added to the RLC layer, the MAC layer, or the newly added adaptation layer (the adaptation layer is added between the RLC protocol layer and the MAC protocol layer that are of the NR gNB).

A specific process in which the LTE eNB is an anchor base station and the NR gNB is a secondary base station is described in the foregoing embodiment. Based on the foregoing embodiment, if transmission of a direct RRC message used when the NR gNB of NR serves as the secondary base station also has an RRC diversity function, in other words, a direct RRC message is transmitted to the terminal by using both the NR gNB and the LTE eNB, because the LTE RRC message is also sent by the LTE eNB to the terminal, and the two messages may be transmitted to the terminal by using one SRB, the corresponding LTE module of the terminal receives an RRC message carried by one SRB. A solution of how to distinguish a source of the RRC message is similar to that in the foregoing embodiment.

In another embodiment of the present disclosure, in an NR high/low-frequency scenario, to be specific, a low-frequency base station of NR serves as an anchor base station (MgNB), and a high-frequency base station of NR serves as a secondary base station (SgNB), a solution of how to distinguish a message source is also similar to that in the foregoing embodiment.

During implementation, at least one step of the foregoing method may be performed by using an integrated logic circuit of hardware in a processor, or the integrated logic circuit may be driven by an instruction in a form of software to perform at least one step. Therefore, a communications apparatus may be a chip or a chip set. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily apparent to a person skilled in the art within the technical scope of the present disclosure shall fall within the protection scope of this application, as exemplified by the accompanying claims.

The invention claimed is:

1. A multi-connectivity communication method, comprising:
    receiving, by a terminal, via different logical channels of an air interface between a secondary base station and the terminal, radio resource control (RRC) messages from the secondary base station, wherein the RRC messages comprise a first RRC message generated by an RRC entity of a master base station and a second RRC message generated by an RRC entity of the secondary base station; and
    identifying, by the terminal, based on the different logical channels, the first RRC message and the second RRC message, the master base station and the secondary base station using different radio access technologies; and further comprising:
    receiving, by the terminal, configuration information of a first signaling radio bearer (SRB) from the secondary base station;
    receiving, by the terminal, configuration information of a second SRB from the secondary base station, wherein receiving the RRC messages from the secondary base station comprises:
        receiving the first RRC message from the secondary base station using the first SRB; and
        receiving the second RRC message from the secondary base station using the second SRB.

2. The method according to claim 1, wherein receiving the configuration information of the first SRB comprises receiving the configuration information of the first SRB from the secondary base station via the master base station, and receiving the configuration information of the second SRB from the secondary base station comprises receiving the configuration information of the second SRB from the secondary base station via the master base station.

3. The method according to claim 2, wherein receiving the configuration information of the first SRB from the secondary base station via the master base station comprises receiving the configuration information of the first SRB from the secondary base station via an interface between the secondary base station and the master base station, and an interface between the master base station and the terminal; and
    receiving the configuration information of the second SRB from the secondary base station via the master base station comprises receiving the configuration information of the second SRB from the secondary base station via the interface between the secondary base station and the master base station, and the interface between the master base station and the terminal.

4. The method according to claim 1, further comprising:
receiving, by the terminal from the secondary base station via the master base station, a correspondence between the configuration information of the first SRB and the RRC entity of the master base station; and
receiving, by the terminal via the interface between the secondary base station and the terminal, a correspondence between the configuration information of the second SRB and the RRC entity of the secondary base station.

5. A communication apparatus for a terminal, comprising:
a processor; and
a non-transitory storage medium coupled to the processor and storing executable instructions that, when executed by the processor, cause the terminal to:
receive, via different logical channels of an air interface between a secondary base station and the terminal, radio resource control (RRC) messages from the secondary base station, the RRC messages comprising a first RRC message generated by an RRC entity of a master base station and a second RRC message generated by an RRC entity of the secondary base station; and
identify, based on the different logical channels, the first RRC message generated by the RRC entity of the master base station, and the second RRC message is generated by the RRC entity of the secondary base station, wherein
the master base station and the secondary base station use different radio access technologies; wherein the instructions, when executed by the processor, further cause the terminal to:
receive configuration information of a first signaling radio bearer (SRB) from the secondary base station; and
receive configuration information of a second SRB from the secondary base station, the receiving the RRC messages from the secondary base station comprising:
receiving the first RRC message from the secondary base station using the first SRB; and
receiving the second RRC message from the secondary base station using the second SRB.

6. The communication apparatus according to claim 5, wherein receiving the configuration information of the first SRB from the secondary base station comprises receiving the configuration information of the first SRB from the secondary base station via the master base station, and receiving the configuration information of the second SRB from the secondary base station comprises receiving the configuration information of the second SRB from the secondary base station via the master base station.

7. The communication apparatus according to claim 6, wherein receiving the configuration information of the first SRB from the secondary base station via the master base station comprises:
receiving the configuration information of the first SRB from the secondary base station via an interface between the secondary base station and the master base station, and an interface between the master base station and the terminal; and
receiving the configuration information of the second SRB from the secondary base station via the master base station comprises:
receiving the configuration information of the second SRB from the secondary base station via the interface between the secondary base station and the master base station, and the interface between the master base station and the terminal.

8. The communication apparatus according to claim 5, wherein the executable instructions, when executed by the processor, further cause the terminal to:
receive, from the secondary base station via the master base station, a correspondence between the configuration information of the first SRB and the RRC entity of the master base station; and
receive, via the interface between the secondary base station and the terminal a correspondence between the configuration information of the second SRB and the RRC entity of the secondary base station.

9. The communication apparatus according to claim 5, wherein the non-transitory storage medium is external of the processor.

10. The communication apparatus according to claim 5, wherein the non-transitory storage medium is incorporated into the processor.

11. A multi-connectivity communication method, comprising:
receiving, by a secondary base station, a first radio resource control (RRC) message generated by an RRC entity of a master base station;
generating, by the secondary base station, a second RRC message via an RRC entity of the secondary base station; and
transmitting, by the secondary base station, the first RRC message and the second RRC message to a terminal via two different logical channels of an air interface between the secondary base station and the terminal, wherein the master base station and the secondary base station use different radio access technologies; and
further comprising:
establishing, by the secondary base station, first and second signaling radio bearers (SRB) corresponding to the two different logical channels;
sending, by the secondary base station, configuration information of the first SRB to the terminal; and
sending, by the secondary base station, configuration information of the second SRB to the terminal;
the transmitting the first RRC message and the second RRC message to the terminal comprising:
transmitting the first RRC message to the terminal using the first SRB; and
transmitting the second RRC message to the terminal using the second SRB.

12. The method according to claim 11, wherein sending, by the secondary base station, the configuration information of the first SRB to the terminal comprises:
sending, by the secondary base station, the configuration information of the first SRB to the terminal via the master base station; and
sending, by the secondary base station, the configuration information of the second SRB to the terminal comprises:
sending, by the secondary base station, the configuration information of the second SRB to the terminal via the master base station.

13. The method according to claim 12, wherein sending, by the secondary base station, the configuration information of the first SRB to the terminal via the master base station comprises:
sending, by the secondary base station, the configuration information of the first SRB to the terminal via an interface between the secondary base station and the master base station, and an interface between the master base station and the terminal; and sending, by the secondary base station, the configuration information of the second SRB to the terminal via the master base station comprises:

sending, by the secondary base station, the configuration information of the second SRB to the terminal via an interface between the secondary base station and the master base station, and an interface between the master base station and the terminal.

14. The method according to claim 11, further comprising:

sending, by the secondary base station, a correspondence between the configuration information of the first SRB and the RRC entity of the master base station to the terminal via the master base station; and sending, by the secondary base station, a correspondence between the configuration information of the second SRB and the RRC entity of the secondary base station to the terminal via the interface between the secondary base station and the terminal.

15. A communication apparatus for a secondary base station, the communication apparatus comprising a processor coupled with a non-transitory storage medium storing executable instructions that, when executed by the processor, cause the secondary base station to:

receive a first radio resource control (RRC) message generated by an RRC entity of a master base station;

initiate an RRC entity of the secondary base station to generate a second RRC message; and transmit the first RRC message and the second RRC message to a terminal via two different logical channels of an air interface between the secondary base station and the terminal, wherein the master base station and the secondary base station use different radio access technologies; and wherein the executable instructions, when executed by the processor, further cause the secondary base station to:

establish first and second signaling radio bearers (SRB) corresponding to the two different logical channels;

send configuration information of the first SRB to the terminal; and send configuration information of the second SRB to the terminal; wherein transmitting the first and second RRC messages to the terminal comprises:

transmitting the first RRC message to the terminal using the first SRB; and transmitting the second RRC message to the terminal using the second SRB.

16. The communication apparatus according to claim 15, wherein sending the configuration information of the first SRB to the terminal comprises sending the configuration information of the first SRB to the terminal via the master base station, and sending the configuration information of the second SRB to the terminal comprises sending the configuration information of the second SRB to the terminal via the master base station.

17. The communication apparatus according to claim 16, wherein sending the configuration information of the first SRB to the terminal via the master base station comprises:

sending the configuration information of the first SRB to the terminal via an interface between the secondary base station and the master base station, and an interface between the master base station and the terminal; and sending the configuration information of the second SRB to the terminal via the master base station comprises sending the configuration information of the second SRB to the terminal via an interface between the secondary base station and the master base station, and an interface between the master base station and the terminal.

18. The communication apparatus according to claim 15, wherein the instructions, when executed by the processor, cause the secondary base station to:

send a correspondence between the configuration information of the first SRB and the RRC entity of the master base station to the terminal via the master base station; and send a correspondence between the configuration information of the second SRB and the RRC entity of the secondary base station to the terminal via the interface between the secondary base station and the terminal.

19. The communication apparatus according to claim 15, wherein the non-transitory storage medium is external of the processor.

20. The communication apparatus according to claim 15, wherein the non-transitory storage medium is incorporated into the processor.

* * * * *